(12) United States Patent
Biskeborn et al.

(10) Patent No.: US 11,935,562 B2
(45) Date of Patent: Mar. 19, 2024

(54) MAGNETIC RECORDING DEVICE HAVING REDUNDANT SERVO READERS AND METHOD FOR USING SAME

(71) Applicant: Western Digital Technologies, Inc., San Jose, CA (US)

(72) Inventors: Robert G. Biskeborn, Hollister, CA (US); Masahito Kobayashi, Fujisawa (JP); Junzo Noda, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 101 days.

(21) Appl. No.: 17/680,068

(22) Filed: Feb. 24, 2022

(65) Prior Publication Data
US 2023/0267964 A1 Aug. 24, 2023

(51) Int. Cl.
G11B 21/10 (2006.01)
G11B 5/48 (2006.01)

(52) U.S. Cl.
CPC .............. G11B 21/103 (2013.01); G11B 5/48 (2013.01)

(58) Field of Classification Search
None
See application file for complete search history.

(56) References Cited

U.S. PATENT DOCUMENTS

| | | | |
|---|---|---|---|
| 6,005,737 A * | 12/1999 | Connolly | G11B 5/584 360/75 |
| 6,563,659 B1 | 5/2003 | Fasen | |
| 7,551,393 B2 * | 6/2009 | Biskeborn | G11B 5/4893 360/316 |
| 7,876,521 B2 | 1/2011 | Cherubini et al. | |
| 8,687,324 B2 | 4/2014 | Biskeborn et al. | |
| 9,058,828 B1 | 6/2015 | Cherubini et al. | |
| 10,297,280 B1 | 5/2019 | Judd et al. | |
| 10,902,882 B1 | 1/2021 | Biskeborn | |
| 11,227,628 B1 * | 1/2022 | Seagle | G11B 5/3948 |
| 11,532,320 B1 * | 12/2022 | Biskeborn | G11B 20/1886 |
| 11,532,325 B1 * | 12/2022 | Le | G11B 5/5504 |
| 11,670,329 B1 * | 6/2023 | Le | G11B 5/02 360/121 |

(Continued)

OTHER PUBLICATIONS

Lantz, Mark A., "Advanced tape technologies", IBM Research, <https://www.zurich.ibm.com/sto/tape/servo/servochannel.html>.

(Continued)

*Primary Examiner* — Fred Tzeng
(74) *Attorney, Agent, or Firm* — PATTERSON + SHERIDAN, LLP; Steven H. VerSteeg

(57) ABSTRACT

The present disclosure is generally related to a tape drive comprising a tape head and a controller coupled to the tape head. The tape head comprises one or more modules, each module comprising a plurality of write heads aligned in a first row, a plurality of read heads aligned in a second row parallel to the first row, and at least four first servo heads aligned in the second row. Two or more first servo heads of the at least four first servo heads are configured to concurrently read first servo data from a first servo track. The controller is configured to concurrently process the first servo data, to compute the position of the tape head based on a known spacing between the at least two servo heads, and to dynamically adjust a position of the tape head based on the processed first servo data.

23 Claims, 20 Drawing Sheets

(56) References Cited

U.S. PATENT DOCUMENTS

| | | | |
|---|---|---|---|
| 11,688,420 B2* | 6/2023 | Malina | G11B 21/006 360/110 |
| 2003/0099059 A1 | 5/2003 | Nakao | |
| 2012/0206832 A1* | 8/2012 | Hamidi | G11B 5/584 360/75 |
| 2016/0049167 A1* | 2/2016 | Biskeborn | G11B 5/00826 360/77.12 |
| 2022/0415344 A1* | 12/2022 | Seagle | G11B 5/3977 |
| 2023/0040698 A1* | 2/2023 | Le | G11B 5/23 |

OTHER PUBLICATIONS

Cherubini, Giovanni et al., "Fast servo signal acquisition in tape drives using servo and data channels", Mechatronics, Advances in Engineering, vol. 22, Issue 3, Apr. 2012, <https://advanceseng.com/fast-servo-signal-acquisition-in-tape-drives-using-servo-and-data-channels/>.

* cited by examiner

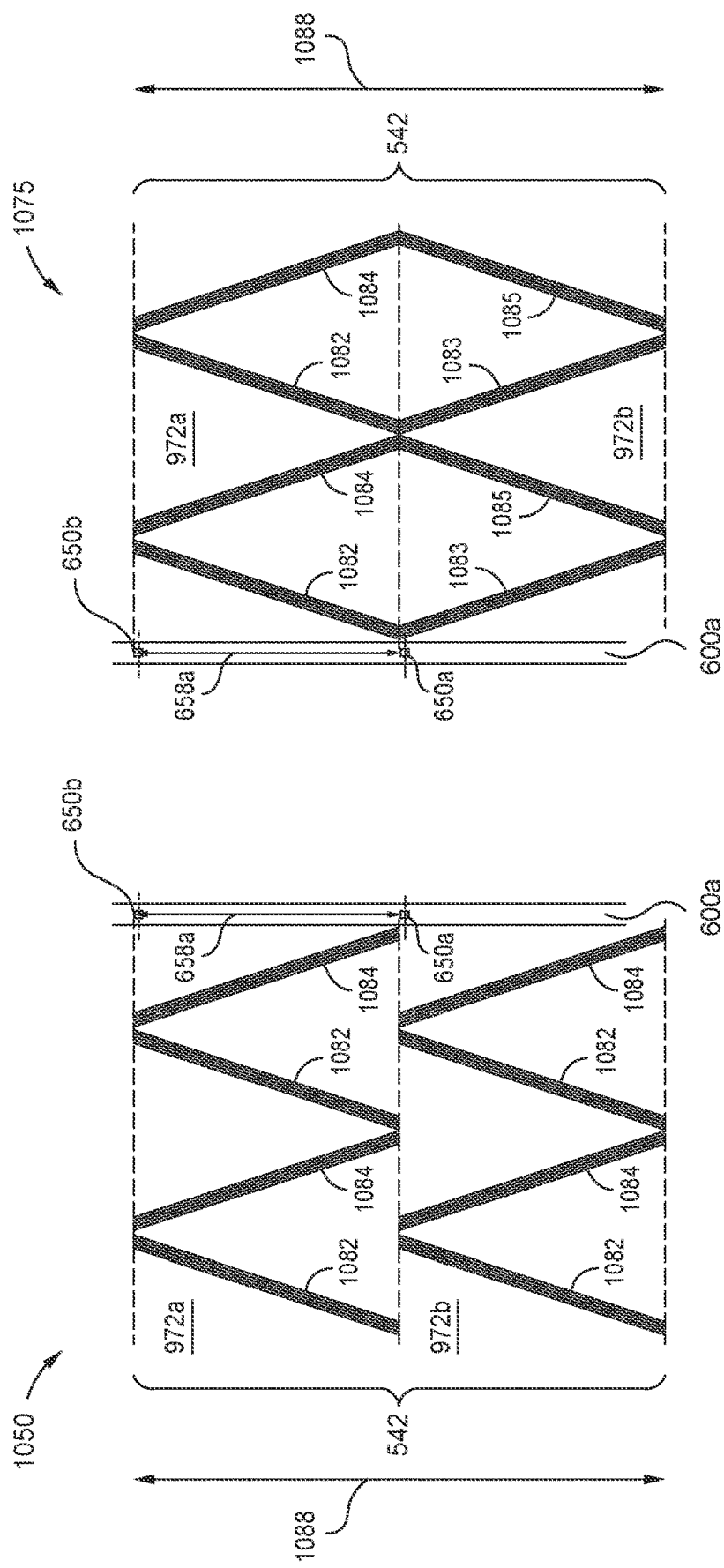

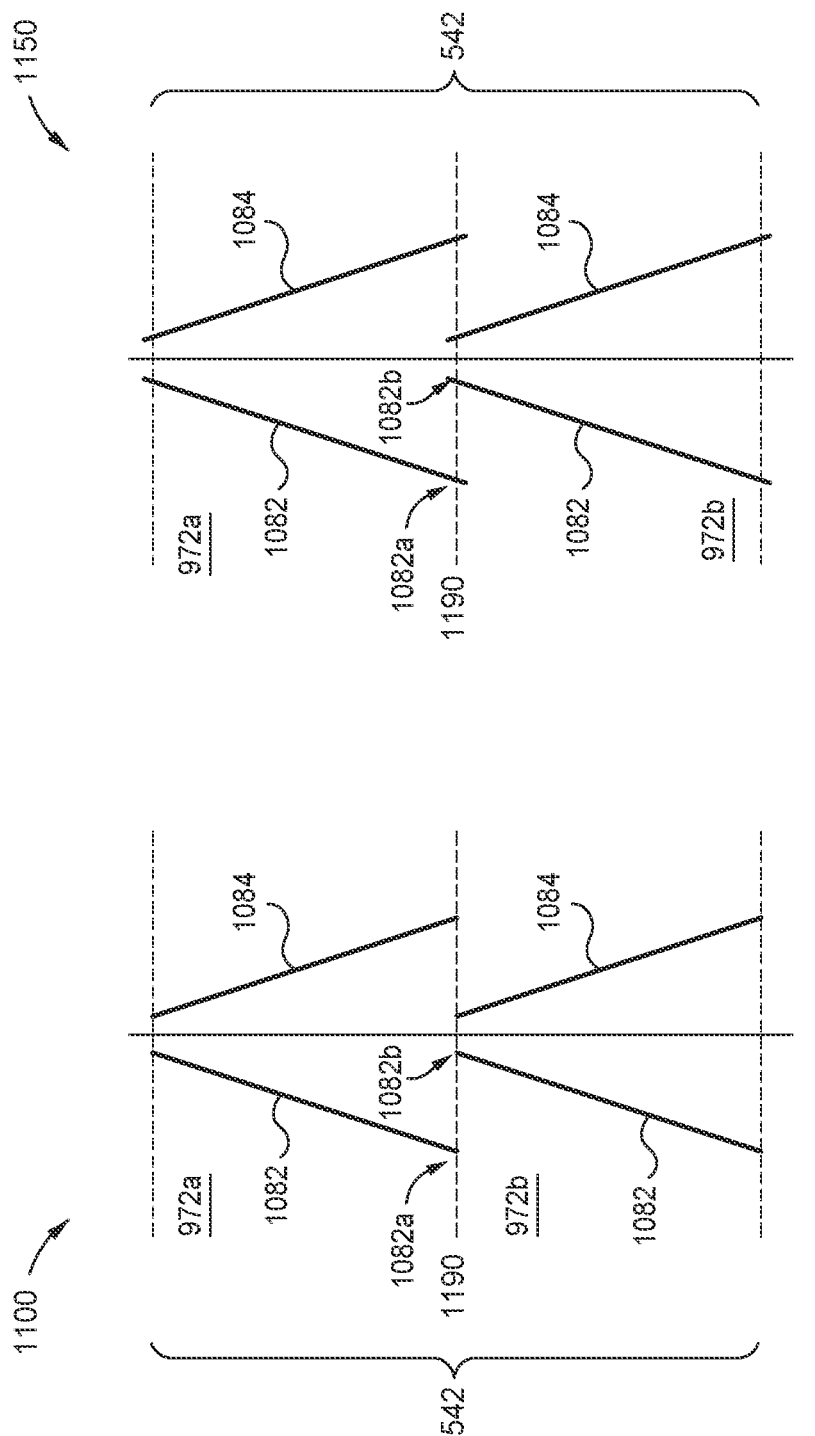

MAGNETIC RECORDING DEVICE HAVING REDUNDANT SERVO READERS AND METHOD FOR USING SAME

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. However, tapes may stretch and/or compress both in tape length and width over time due to a variety of reasons, such as environmental causes like humidity and temperature, workload, and general wear of the tape. As such, as the tape stretches and compresses, the positioning information in the servo tracks may become outdated, thus making accurate positioning of the tape head difficult.

Therefore, there is a need in the art for a tape head capable of accurate positioning over a tape dynamically.

SUMMARY OF THE DISCLOSURE

The present disclosure is generally related to a tape drive comprising a tape head and a controller coupled to the tape head. The tape head comprises one or more modules, each module comprising a plurality of write heads aligned in a first row, a plurality of read heads aligned in a second row parallel to the first row, and at least four first servo heads aligned in the second row. Two or more first servo heads of the at least four first servo heads are configured to concurrently read first servo data from a first servo track. The controller is configured to concurrently process the first servo data, to compute the position of the tape head based on a known spacing between the at least two servo heads, and to dynamically adjust a position of the tape head based on the processed first servo data.

In one embodiment, a tape head comprises one or more modules, each of the one or more modules comprising: a plurality of write heads aligned in a first row, the first row extending in a first direction, a first servo head offset from the plurality of write heads in the first direction and a second direction perpendicular to the first direction, a second servo head disposed adjacent to the first servo head, the second servo head being aligned with the first servo head in a second row parallel to the first row, a plurality of read heads disposed adjacent to the second servo head, the plurality of read heads being aligned in a third row parallel to the first and second rows, a third servo head disposed adjacent to the plurality of read heads, the third servo head being aligned in the second row, wherein the third servo head is spaced from the second servo head by the plurality of read heads, and a fourth servo head disposed adjacent to the third servo head, the fourth servo head being aligned in the second row.

In another embodiment, a tape head comprises a first module comprising: a plurality of first write heads aligned in a first row, the first row extending in a first direction, two or more first servo heads aligned in a second row parallel to the first row, the second row extending in the first direction, wherein the two or more first servo heads are disposed adjacent to one another, two or more second servo heads aligned in the second row, the two or more second servo heads being disposed adjacent to one another, and a plurality of first read heads aligned in a third row parallel to the first and second rows between the two or more first servo heads and the two or more second servo heads. The tape head further comprises a second module, comprising: a plurality of second write heads aligned in a fourth row parallel to the first and second rows, the third row extending in the first direction, two or more third servo heads aligned in a fifth row parallel to the fourth row, the fourth row extending in the first direction, wherein the two or more third servo heads are disposed adjacent to one another, two or more fourth servo heads aligned in a sixth row parallel to the fourth and fifth rows, the two or more fourth servo heads being disposed adjacent to one another, and a plurality of second read heads aligned in the fifth row between the two or more third servo heads and the two or more fourth servo heads.

In yet another embodiment, a tape drive comprises a tape head comprising a first module, the first module comprising: a plurality of first write heads aligned in a first row, the first row extending in a first direction, a plurality of first read heads aligned in a second row parallel to the first row, the second row extending in the first direction, and at least four first servo heads aligned in a third row parallel to the first and second rows, wherein two or more first servo heads of the at least four first servo heads are configured to concurrently read first servo data from a first servo track, and means for concurrently processing the first servo data from the two or more first servo heads.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 10A-10C illustrate various types of servo patterns that may be written to a servo tracks, according to various embodiments.

FIGS. 11A-11B illustrate various types of servo patterns that may be written to a servo tracks, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a tape drive comprising a tape head and a controller coupled to the tape head. The tape head comprises one or more modules, each module comprising a plurality of write heads aligned in a first row, a plurality of read heads aligned in a second row parallel to the first row, and at least four first servo heads aligned in the second row. Two or more first servo heads of the at least four first servo heads are configured to concurrently read first servo data from a first servo track. The controller is configured to concurrently process the first servo data, to compute the position of the tape head based on a known spacing between the at least two servo heads, and to dynamically adjust a position of the tape head based on the processed first servo data.

Figure 1A:
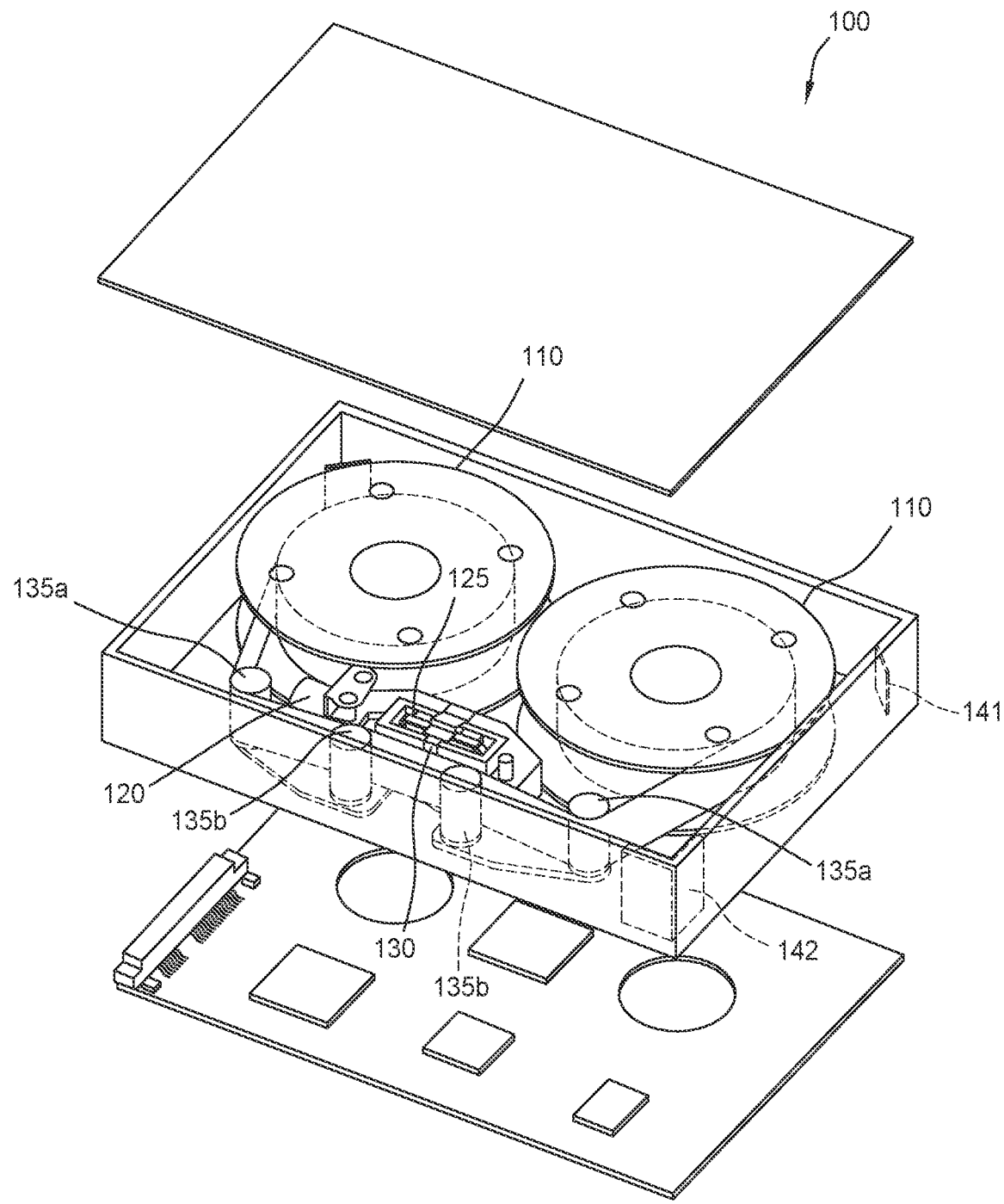
FIGS. 1A-1C illustrate a perspective exploded view, a simplified top down, and side profile view of a tape drive, in accordance with some embodiments.
Figure 1B:
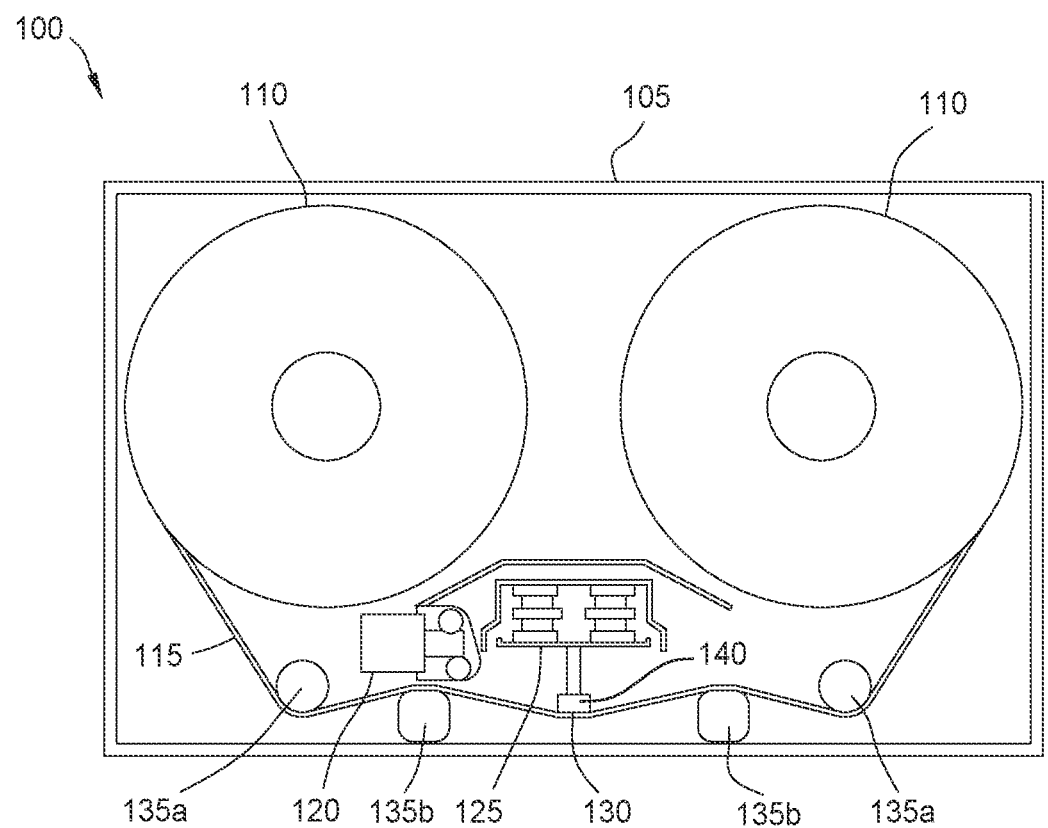
Figure 1C:
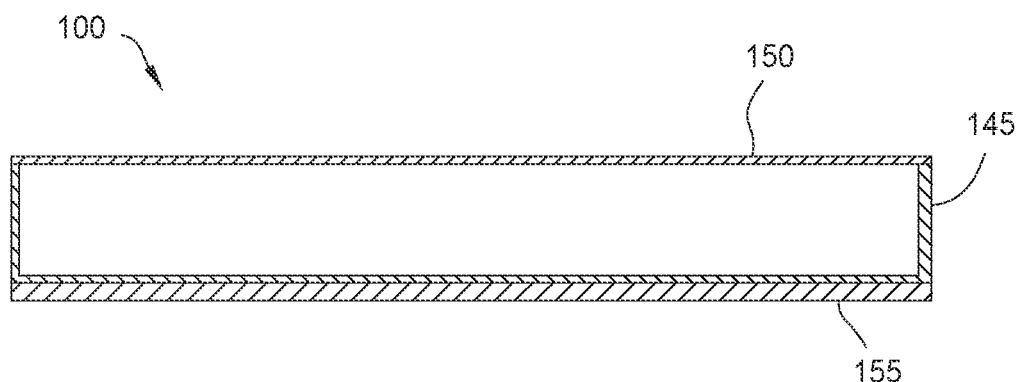

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head" or "module", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the module or head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
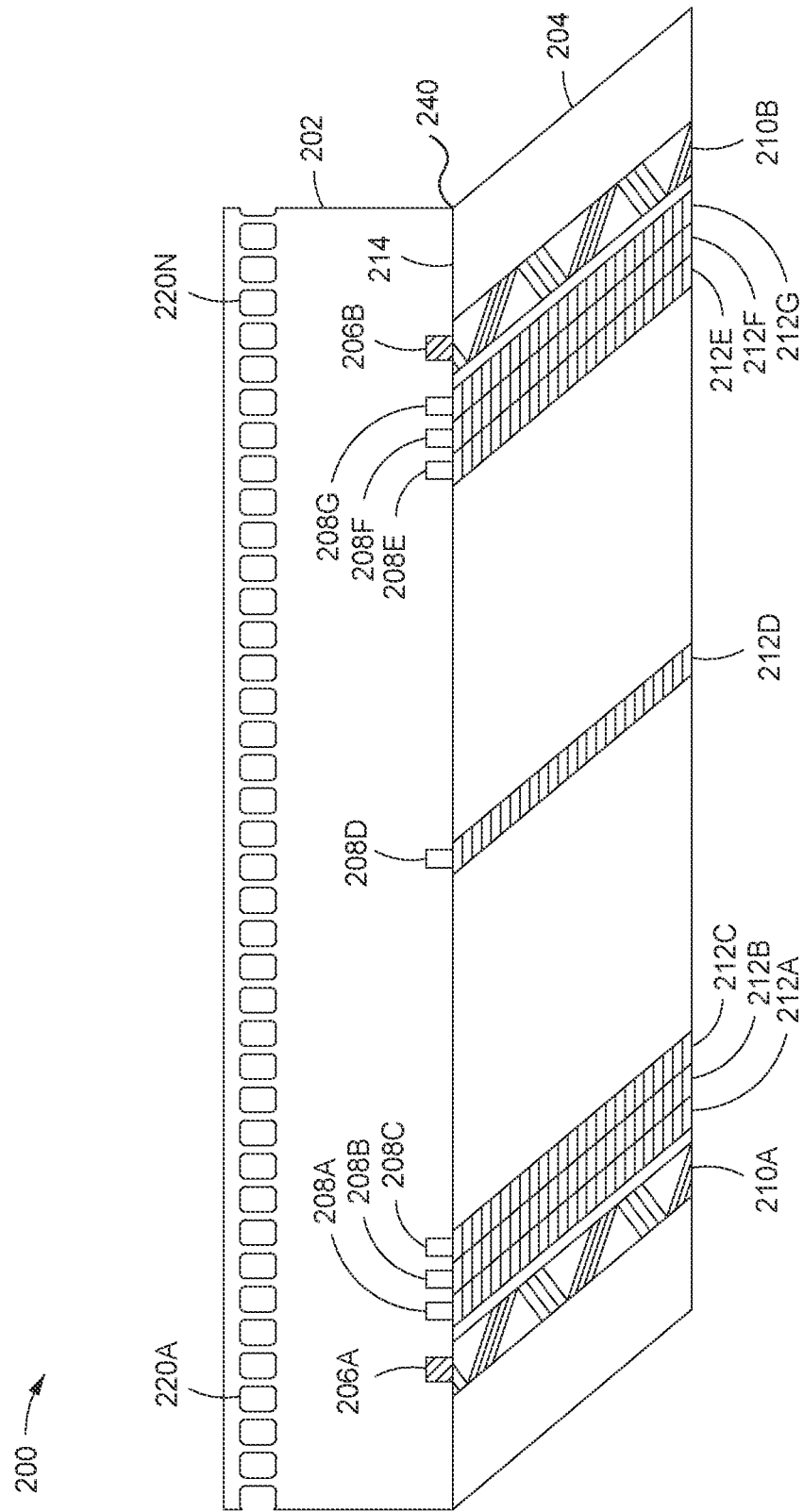
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller 240, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data track (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
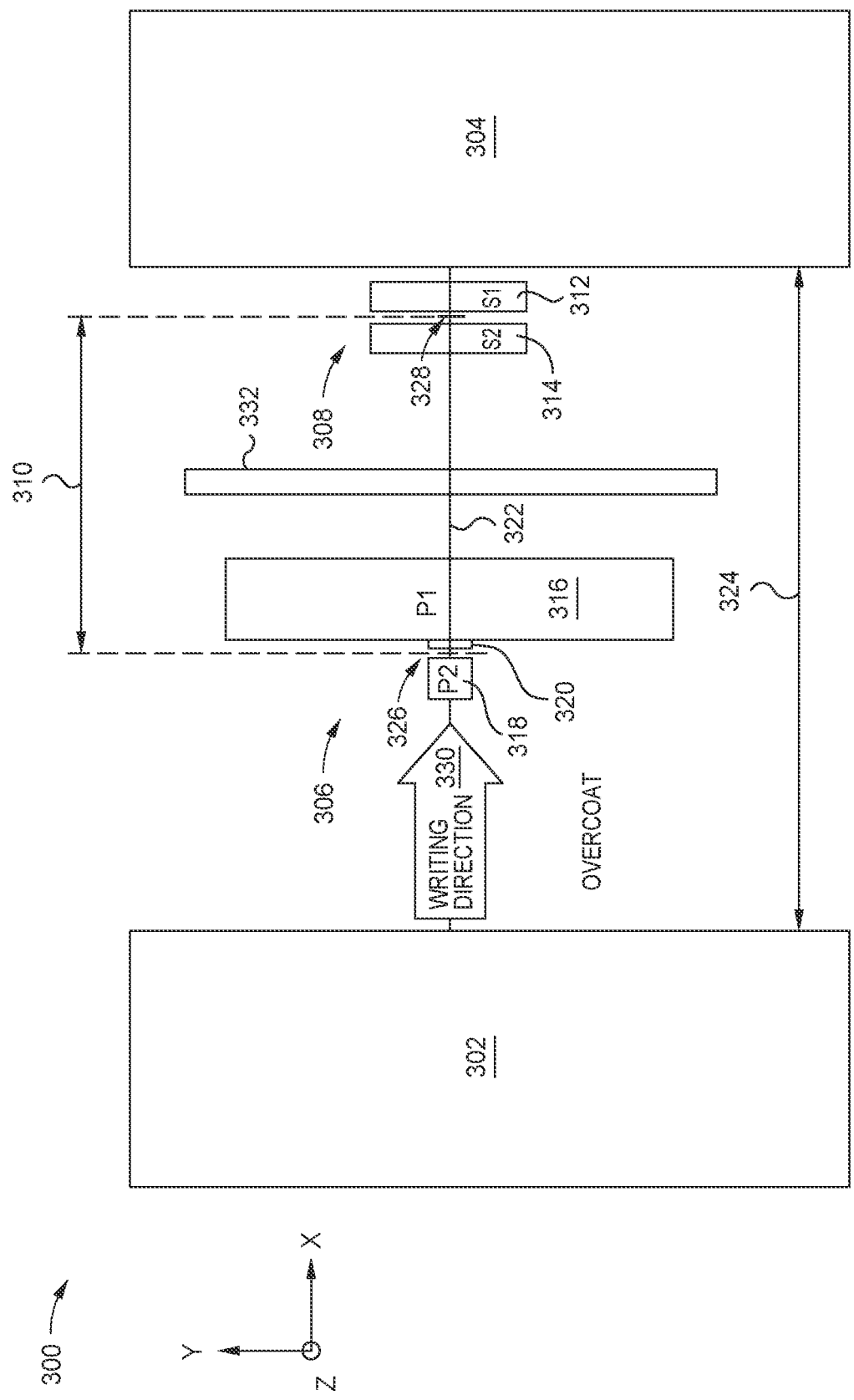
FIGS. 3A-3B illustrate a media facing surface (MFS) view of same gap verify (SGV) modules, according to various embodiments.
Figure 3B:
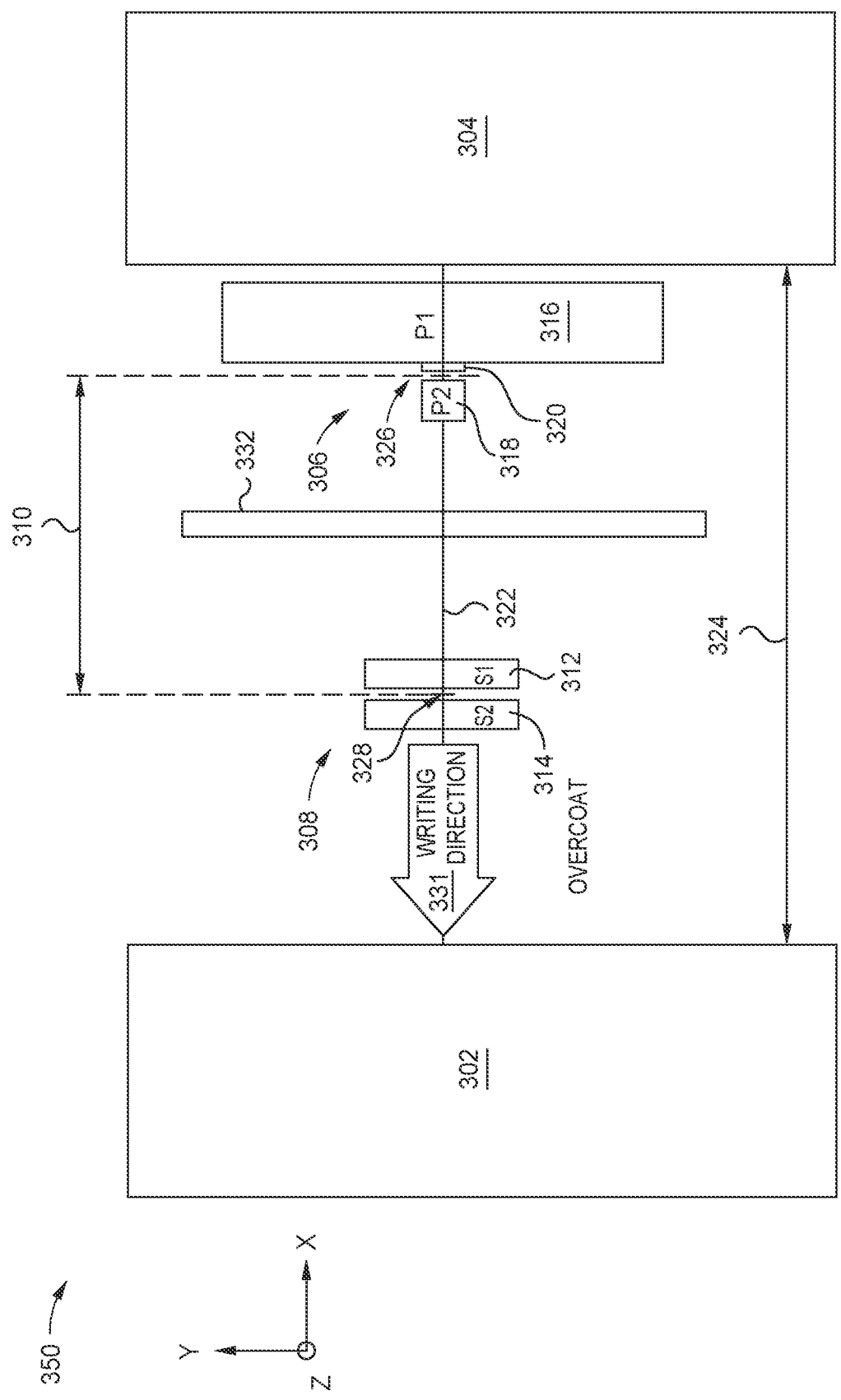

FIGS. 3A-3B illustrate a media facing surface (MFS) view of same gap verify (SGV) modules 300, 350, respectively, according to various embodiments. The SGV modules 300, 350 may be utilized within a tape drive comprising a controller, such as the TED or tape drive 100 of FIG. 1A. The SGV modules 300, 350 may be in a form similar to the generalized tape head module assembly 200 of FIG. 2 or a portion of it, but with their unique features and arrangements according to various embodiments.

The SGV module 300 comprises a closure 302, one or more write transducers 306 disposed adjacent to the closure 302, one or more read transducers 308 disposed adjacent to the one or more write transducers 306, and a substrate 304 disposed adjacent to the one or more read transducers 308. The SGV module 350 comprises a closure 302, one or more read transducers 308 disposed adjacent to the closure 302, one or more write transducers 306 disposed adjacent to the one or more read transducers 308, and a substrate 304 disposed adjacent to the one or more write transducers 306. Each of the one or more write transducers 306 and the one or more read transducers 308 are disposed on the substrate 304. The write transducer(s) 306 may be referred to as a writer(s) 306 or write head(s) 306, and the read transducer(s) 308 may be referred to as a reader(s) 308 or read head(s) 308.

While only one writer 306 and one reader 308 pair is shown in FIGS. 3A-3B, the SGV module 300 may comprise a plurality of writer 306 and reader 308 pairs, which may be referred to as a head array. For example, in some embodiments, the SGV modules 300, 350 each comprise a head array of 32 writers 306 and 32 readers 308, forming 32 writer 306 and reader 308 pairs, along with one or more servo readers (not shown).

In each of the SGV modules 300, 350, a writer 306 is spaced a distance 310 from a reader 308 of about 6 μm to about 20 μm, such as about 6 μm to about 15 μm. In embodiments comprising a plurality of writer 306 and a plurality of reader 308 pairs, each writer 306 is spaced the distance 310 from an adjacent paired reader 308. The closure 302 is spaced a distance 324 from the substrate 304 of about 20 μm to about 60 μm. In some embodiments, a shield 332 is disposed between the writer 306 and the reader 308 of each pair to reduce cross-talk signals to the reader 308 from the writer 306. The shield 332 may comprise permalloy and may be combined with Ir for wear resistance, for example.

Each of the writers 306 comprises a first write pole P1 316 and a second write pole P2 318. A notch 320 may be disposed on the P1 316. The notch 320 is disposed adjacent to a write gap 326, where the P1 316 is spaced from the P2 318 by a distance in the x-direction at least twice the length of the write gap 326. Each of the readers 308 comprises a first shield S1 312, a second shield S2 314, and a magnetic sensor 328 disposed between the S1 312 and the S2 314. The magnetic sensor 328 may be a tunnel magnetoresistance (TMR) sensor, for example. The write gap 326 and the magnetic sensor 328 are aligned or centered upon a center axis 322 in the y-direction such that the center axis 322 is aligned with a centerline of the write gap 326 and a centerline of the magnetic sensor 328. In embodiments in which the SGV assembly 300 is actively tilted, such as for compensating TDS, the writer 306 and the reader 308 may be offset relative to the center axis. In some embodiments, the distance 310 is measured from the write gap 326 to an MgO layer (not shown) of the magnetic sensor 328.

In the SGV assembly 300 of FIG. 3A, when writing data to a tape or other media, the tape moves over the writer 306 in the writing direction 330 (e.g., in the x-direction). In the SGV assembly 350 of FIG. 3B, when writing data to a tape or other media, the tape moves over the writer 306 in the writing direction 331 (e.g., in the −x-direction). Due at least in part to the distance 310 between the write gap 326 and the magnetic sensor 328 of a writer 306 and reader 308 pair, the writer 306 is able to write to the media, and the reader 308 is able to read the data to verify the data was written correctly. As discussed above, the shield 332 may be used to further reduce magnetic cross-talk between the writer 306 and the reader 308. Thus, the writer 306 is able to write data to a portion of the tape, and the paired reader 308 is able to read verify the newly written portion of the tape immediately. As such, the SGV module 300 is able to write data to and read verify data from a tape concurrently. The SGV module 350, similar constructed, also has this immediate verify capability.

The SGV modules 300, 350 are each able to concurrently write and read data due in part to the separation distance 310 between the write gap 326 and the magnetic sensor 328 of a writer 306 and reader 308 pair. The write gap 326 and magnetic sensor 328 are spaced far enough apart that the amplitude of signals in the reader 308 that arise from coupling of magnetic flux from the paired writer 306 is reduced or substantially less than the readback signal of the reader 308 itself.

As used herein, the SGV modules 300, 350 being able to "concurrently" write and read data refers to the fact that both the writer 306 and the reader 308 are concurrently turned "on" or able to operate simultaneously with respect to various data written to a tape. However, it is to be noted that the writer 306 and the reader 308 are not "concurrently" operating on the same data at the same time. Rather, the writer 306 first writes data, and as the tape moves over the reader 308, the reader 308 is then able to read verify the newly written data as the writer 306 concurrently writes different data to a different portion of the tape. Furthermore, it is to be noted that a controller (not shown) is configured to operate the SGV modules 300, 350, and as such, the controller is configured to independently operate both the writer 306 and the reader 308. Thus, while the writer 306 is described as writing data and the reader 308 is described as reading the data, the controller enables the writer 306 to write and enables the reader 308 to read.

Figure 4:
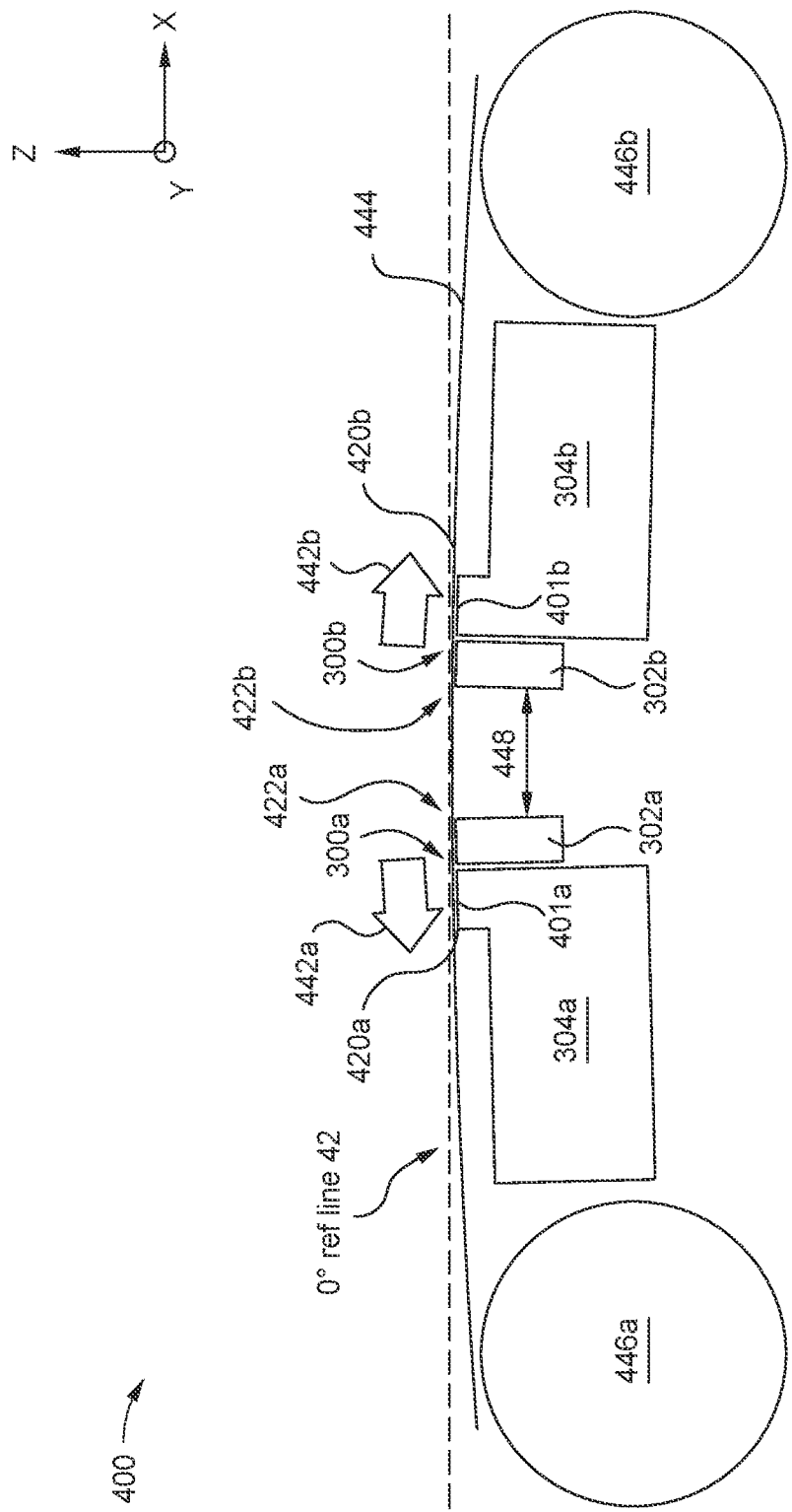
FIG. 4 illustrates a side view of a tape head comprising two SGV modules, according to one embodiment.

FIG. 4 illustrates a side view of a tape head 400 comprising two SGV modules 300a, 300b, according to one embodiment. The tape head 400 comprises a first SGV module 300a and a second SGV module 300b. Each SGV module 300a, 300b may be the SGV module 300 shown in FIG. 3A or FIG. 3B. The first SGV module 300a and the second SGV module 300b may be coupled together. In some embodiments, the read and write transducers 308, 306 in the first and second SGV modules 300a, 300b may be aligned, to example, to operate in a legacy mode where one SGV module (e.g., the first SGV module 300a) writes data and the other SGV module (e.g., the second SGV module 300b) reads the data written by the first SGV module 300a. The tape head 400 illustrates a conventional SGV tape head 400 where the tape 444 contacts both the MFS 401a of the first SGV module 300a and the MFS 401b of the second SGV module 300b simultaneously in both directions the tape 444 moves.

In one embodiment, the first SGV module 300a comprises a first closure 302a, one or more first writers 306 (shown in FIG. 3A) disposed adjacent to the first closure 302a, one or more first readers 308 (shown in FIG. 3A) disposed adjacent to the one or more first writers 306, and a first substrate 304a disposed adjacent to the one or more first readers 308. Similarly, in such an embodiment, the second SGV module 300b comprises a second closure 302b, one or more second writers 306 (shown in FIG. 3A) disposed adjacent to the second closure 302b, one or more second readers 308 (shown in FIG. 3A) disposed adjacent to the one or more second writers 306, and a second substrate 304b disposed adjacent to the one or more second readers 308. The first SGV module 300a has a first writing and reading direction 442a that is opposite to a second writing and reading direction 442b of the second SGV module 300b.

In one embodiment, the first SGV module 300a and the second SGV module 300b are arranged in a face-to-face configuration or arrangement such that the first closure 302a of the first SGV module 300a is disposed adjacent or proximate to the second closure 302b of the second SGV module 300b. In other words, the first SGV module 300a is a mirror image of the second SGV module 300b, the second SGV module 300b is a right hand module like that shown in FIG. 3A and the first SGV module 300a is a left hand module. The first SGV module 300a is spaced a distance 448 from the second SGV module 300b of about 100 μm to about 1000 μm.

In other embodiments, the first SGV module 300a and the second SGV module 300b are arranged in a substrate-to-substrate configuration or reversed configuration, where the first substrate 304a is disposed adjacent to the second substrate 304b, and tape 444 encounters or passes over either the first closure 302a or the second closure 302b prior to passing over either the first or second substrate 304a, 304b, respectively. In such a configuration where the first and second modules 300a, 300b are arranged like shown in FIG. 3A, the first module 300a has the second writing and reading direction 442b that is opposite to the first writing and reading direction 442a of the second SGV module 300b.

Referring to FIG. 4, which shows a conventional SGV tape head 400, a MFS 401a, 401b of each of the first and second SGV modules 300a, 300b is configured to support a tape 444 or other magnetic media. The MFS 401a, 401b of each of the first and second SGV modules 300a, 300b includes surfaces of the writers 306 and the readers 308 of each SGV module 300a, 300b. In some embodiments, the tape 444 may contact and wrap around a first substrate corner 420a and a first closure corner 422a of the first SGV module 300a, and contact and wrap around a second closure corner 422b and a second substrate corner 420b of the second SGV module 300b, resulting in the tape 444 being bent or angled downwards from a 0° reference line 426 (e.g., parallel to the x-axis). In such a configuration, the tape 444 contacts both the MFS 401a and the MFS 401b simultaneously in both directions the tape 444 moves.

In other embodiments, the tape 444 may contact only one MFS (e.g., the first MFS 401a) while flying over or being spaced from the other MFS (e.g., the second MFS 401b), often referred to as upstream or downstream flying. In such an embodiment, only one SGV module 300a writes and reads data while the other SGV module 300b does not write or read data (i.e., upstream flying). An example tape drive configured to enable upstream and/or downstream flying is described in co-pending patent application titled "Tape Drive Configured to Enable Magnetic Media to Fly Above an Upstream or a Downstream Module," U.S. application Ser. No. 17/512,127, filed Oct. 27, 2021, assigned to the same assignee of this application, which is herein incorporated by reference.

The first SGV module 300a and the second SGV module 300b are both able to independently write and read verify data. For example, a first writer 306 of the first SGV module 300a is able to write data to a portion of the tape 444, and an aligned or paired first reader 308 of the first SGV module 300a is able to read verify the newly written portion of the tape 444 immediately. Similarly, a second writer 306 of the second SGV module 300b is able to write data to a portion of the tape 444, and an aligned or paired second reader 308 of the second SGV module 300b is able to read verify the newly written portion of the tape 444 immediately. As such, the first SGV module 300a is able to write data to and read verify data from a tape independently from the second SGV module 300b, and the second SGV module 300b is able to write data to and read verify data from a tape independently from the first SGV module 300a.

Figure 5A:
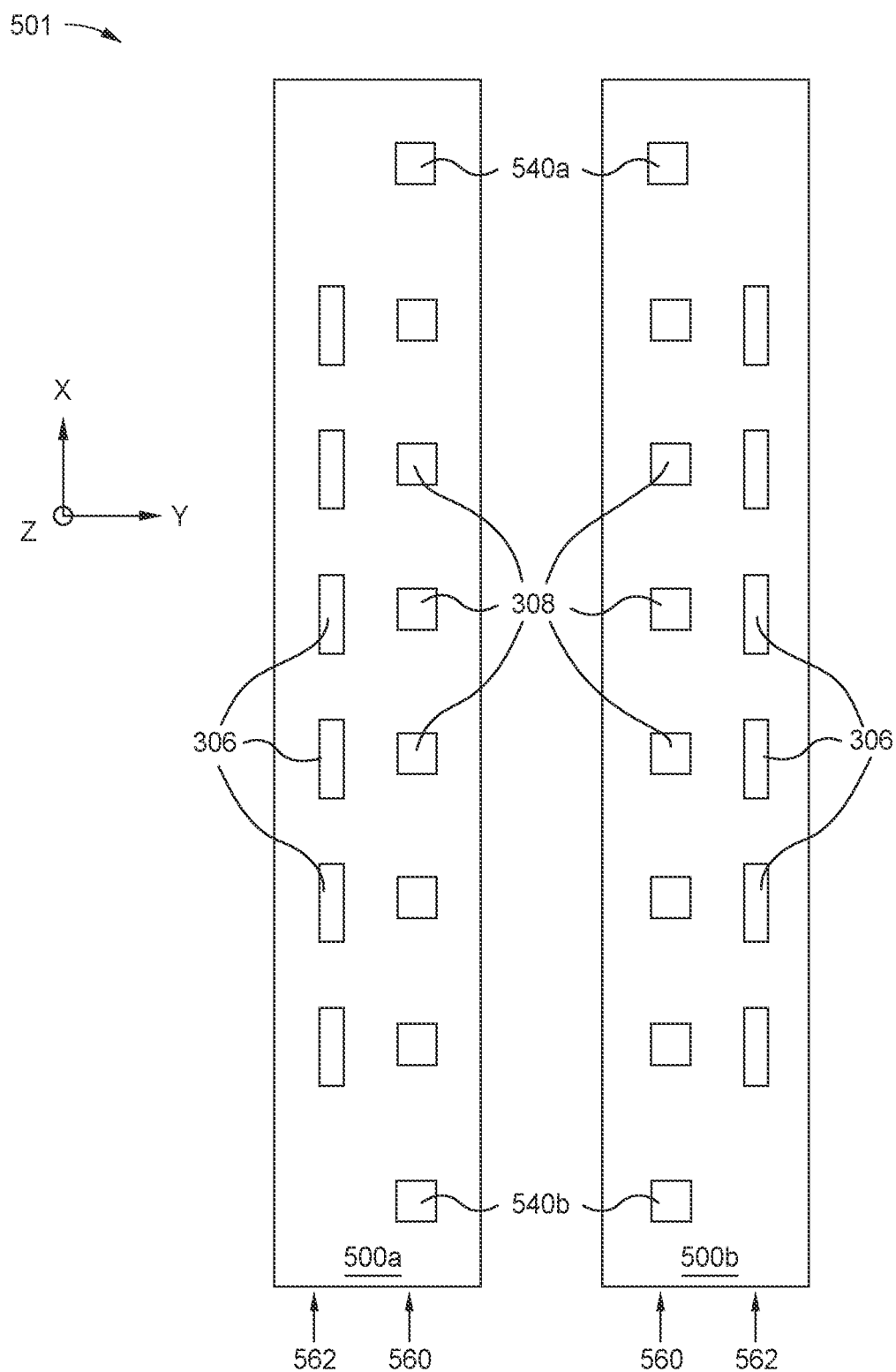
FIGS. 5A-5B illustrate MFS views of a conventional tape head, according to one embodiment.
Figure 5B:
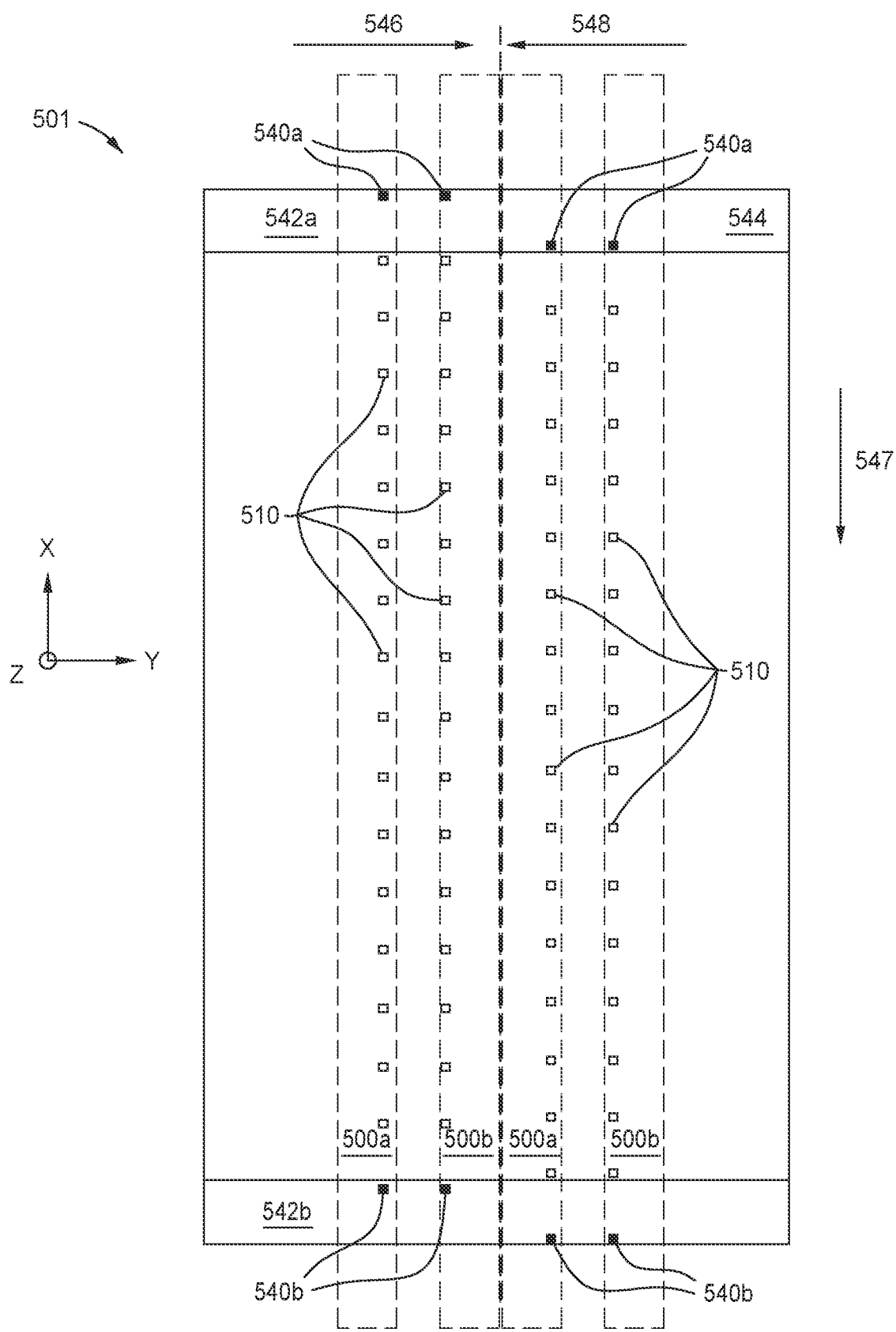

FIGS. 5A-5B illustrate MFS views of a conventional tape head 501, according to one embodiment. FIG. 5A illustrates a schematic tape head 501, while FIG. 5B illustrates the tape head 501 as a tape 544 moves over the tape head 501 in a first direction 546 and a second direction 548. The tape head 501 comprises a first module 500a and a second module 500b. While two modules 500a, 500b are shown, the tape head 501 may comprise only one module in some embodiments.

Each module 500a, 500b comprises a plurality of read heads 308 disposed in a first row 560 and a plurality of write heads 306 disposed in a second row 562 adjacent to the first row 560. Each of the plurality of write heads 308 is aligned with an adjacent read head 308 in the y-direction. One read head 308 and one write head 306 pair may be referred to as a data head 510. Thus, as shown in FIG. 5B, each module 500a, 500b comprises a plurality of data heads 510. The plurality of read heads 308 may be the read head 308 of FIGS. 3A-3B, and the plurality of write heads 306 may be the write head 306 of FIGS. 3A-3B. While each module 500a, 500b is shown comprising six write heads 306 and six read heads 308, the modules 500a, 500b may comprise any number of write heads 306 and read heads 308, and thus, the number of write heads 306 and read heads 308 is not intended to be limiting.

Each module 500a, 500b further comprises a first servo head 540a and a second servo head 540b. The first servo heads 540a of each module 500a, 500b are aligned with one another in the y-direction, and the second servo heads 540b of each module 500a, 500b are aligned with one another in the y-direction. The first and second servo heads 540a, 540b are spaced from one another by the plurality of read heads 308, and the first and second servo heads 540a, 540b are aligned with the first row 560 of read heads 308 in the x-direction. In some embodiments, the first and second servo heads 540a, 540b are spaced from one another by the plurality of write heads 306 and are aligned with the second row 562 of write heads 306 in the x-direction. The first and second servo heads 540a, 540b are individually configured to read servo tracks 542a, 542b, respectively, on a tape 544 to position the tape head 501 when writing data to and reading data from the tape 544.

As shown in FIG. 5B, when writing or reading data to the tape 544 as the tape 544 moves in a first or outbound direction 546 (e.g., the y-direction) over the tape head 501, the first servo heads 540a are positioned at the top or edge of the first servo track 542a, and the second servo heads 540b are positioned at the top of edge of the second servo track 542b. Upon writing or reading data from the tape 544 as the tape 544 moves in the first direction 546, the tape 544 moves in a third direction 547 (e.g., the −x-direction) perpendicular to the first direction 546 to the next data band such that data is written to and read from the tape 544 in a serpentine pattern. When writing or reading data to the tape 544 as the tape 544 moves in a second or inbound direction 548 (e.g., the −y-direction) over the tape head 501, the first servo heads 540a are positioned at the bottom or edge of the first servo track 542a, and the second servo heads 540b are positioned at the bottom of edge of the second servo track 542b. The tape 544 then moves in the third direction 547 once again, and the tape head 501 repeats writing and reading data from the tape 544 in the serpentine manner.

Thus, the first and second servo heads 540a, 540b are only able to read small portions of the servo tracks 542a, 542b (e.g., the upper and lower edges of the servo tracks 542a, 542b). As such, the servo information read from the servo tracks 542a, 542b may be inadequate to properly align the tape head 501 as needed, especially when the tape has expanded or compressed due to tape dimensional stability (TDS) effects.

Figure 6A:
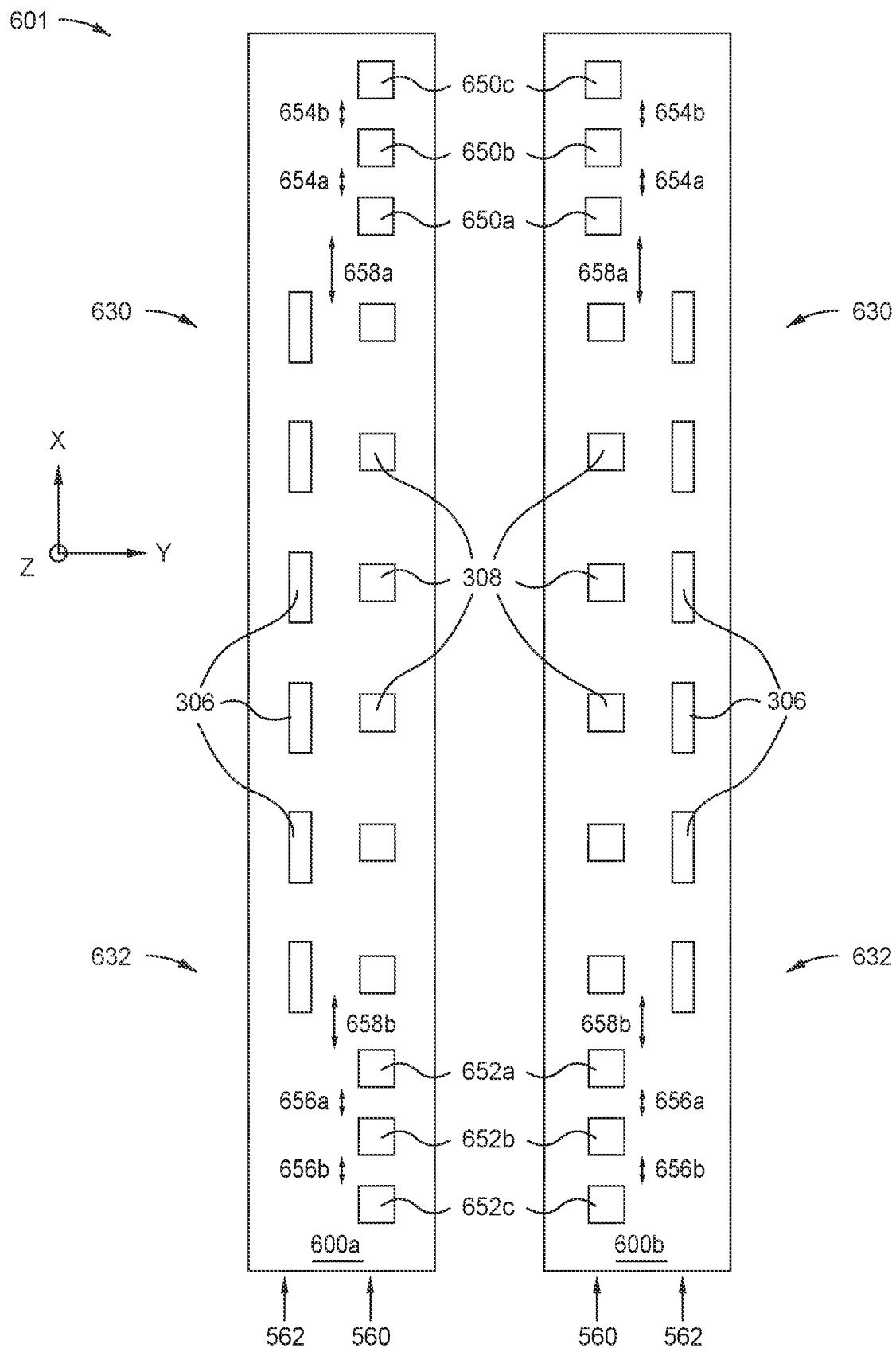
FIGS. 6A-6C illustrate MFS views of tape heads comprising a plurality of adjacent servo heads, according to one embodiment.
Figure 6B:
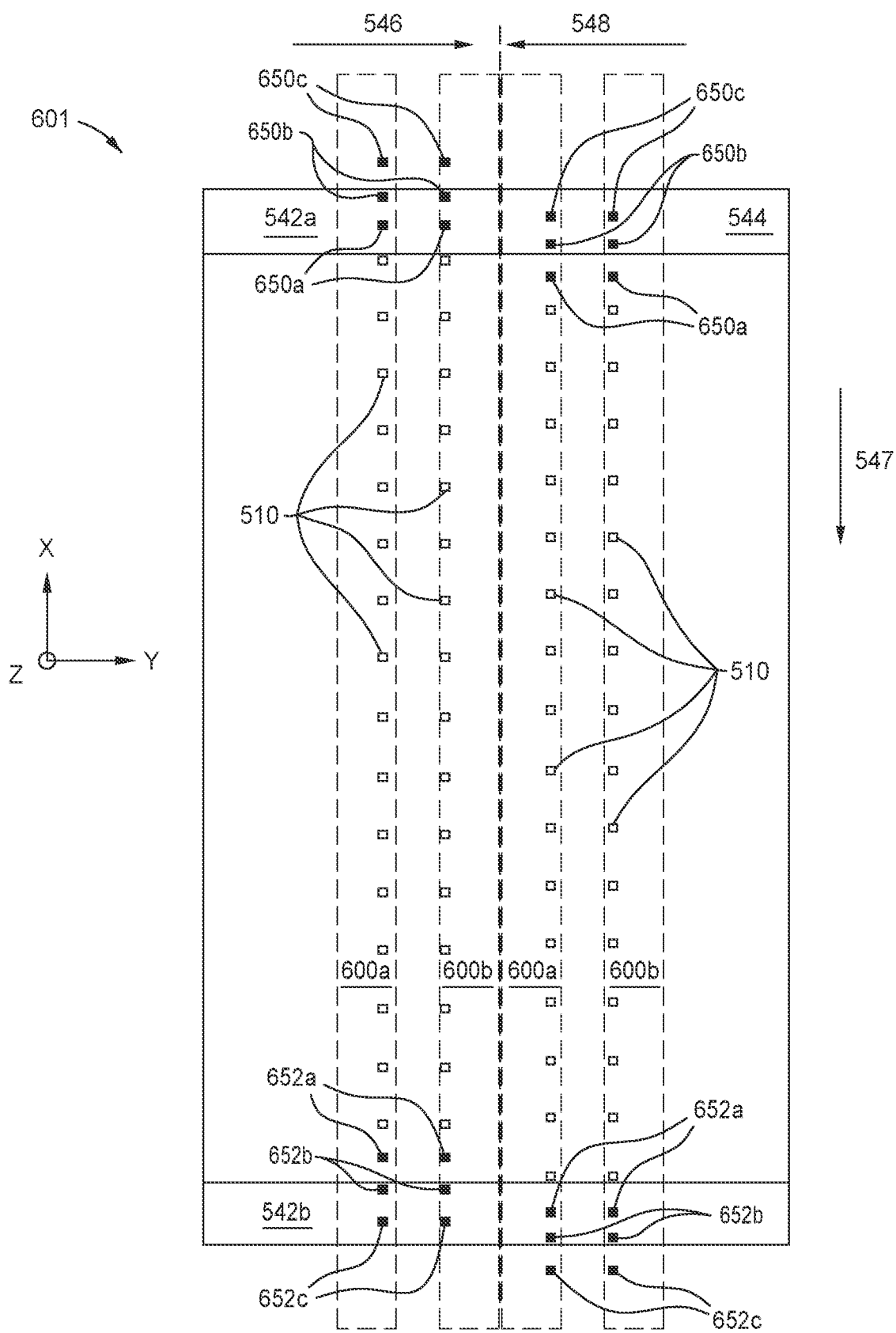
Figure 6C:
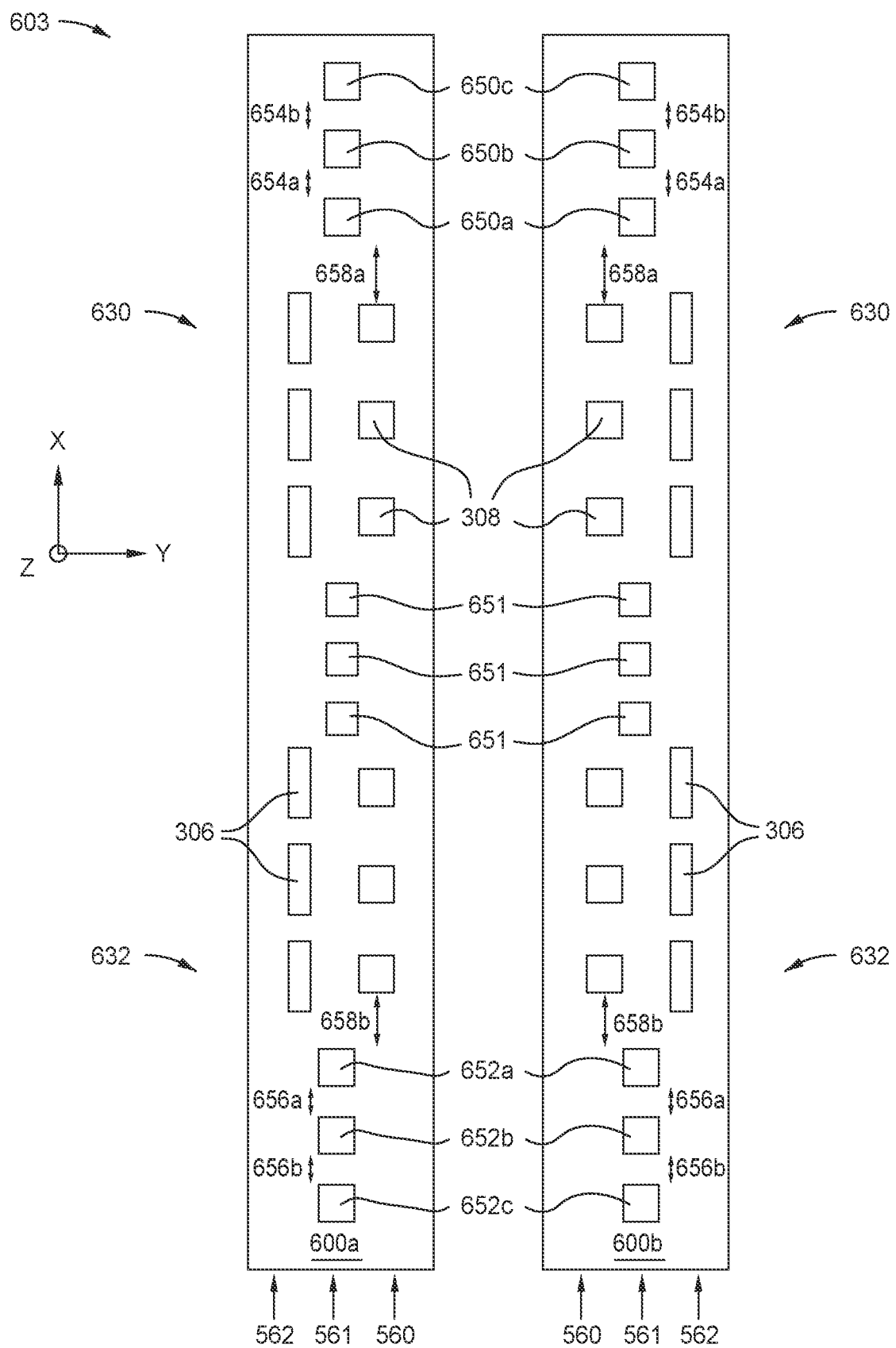

FIGS. 6A-6C illustrate MFS views of a tape head 601 comprising a plurality of adjacent servo heads, according to one embodiment. FIGS. 6A and 6C illustrate a schematic tape head 601, 603, respectively, while FIG. 6B illustrates the tape head 601 as a tape 544 moves over the tape head 601 in a first direction 546 and a second direction 548. The tape head 601 may be utilized within a tape drive comprising a controller, such as the TED or tape drive 100 comprising the controller 140 of FIGS. 1A-1C. The tape head 601 may be configured to enable upstream or downstream flying, as discussed above. Aspects of the tape heads 601 and 603 may each individually be used in combination with aspects of the tape head 701 of FIGS. 7A-7B and/or with aspects of the tape head 801 of FIGS. 8A-8B.

The tape head 601 comprises a first module 600a and a second module 600b. While two modules 600a, 600b are shown, the tape head 601 may comprise only one module in some embodiments. Each module 600a, 600b may be the SGV module 300 shown in FIG. 3A or the SGV module 350 shown in FIG. 3B configured to concurrently write data to and read data from the tape 544. The modules 600a, 600b may be in a form similar to the generalized tape head module assembly 200 of FIG. 2 or a portion of it, but with their unique features and arrangements according to various embodiments.

Each module 600a, 600b comprises a plurality of read heads 308 disposed in a first row 560 and a plurality of write heads 306 disposed in a second row 562 adjacent to the first row 560. Each of the plurality of write heads 308 is aligned with an adjacent read head 308 in the y-direction. One read head 308 and one write head 306 pair may be referred to as a data head 510. Thus, as shown in FIG. 6B, each module 600a, 600b comprises a plurality of data heads 510. The plurality of read heads 308 may be the read head 308 of FIGS. 3A-3B, and the plurality of write heads 306 may be the write head 306 of FIGS. 3A-3B. While each module 600a, 600b is shown comprising six write heads 306 and six read heads 308, the modules 600a, 600b may comprise any number of write heads 306 and read heads 308, and thus, the number of write heads 306 and read heads 308 is not intended to be limiting.

Each module 600a, 600b further comprises a first servo head 650a disposed adjacent to a first end 630 of the first row 560 of the plurality of read heads 308, a second servo head 650b disposed adjacent to the first servo head 650a, and a third servo head 650c disposed adjacent to the second servo head 650b. The first, second, and third servo heads 650a, 650b, 650c of each module 600a, 600b are aligned in the x-direction with the first row 560 of the plurality of read heads 308. The first servo head 650a is spaced a first distance 654a of about 20 μm to about 100 μm from the second servo head 650b, and is spaced a second distance 658a of about 20 μm to about 100 μm from an adjacent read head 308 disposed on the first end 630 of the first row 560. The second servo head 650b is spaced a third distance 654b of about 20 μm to about 100 μm from the third servo head 650c. The first distance 654a is substantially equal to the third distance 654b.

The first servo head 650a of the first module 600a is aligned in the y-direction with the first servo head 650a of the second module 600b, the second servo head 650b of the first module 600a is aligned in the y-direction with the second servo head 650b of the second module 600b, and the third servo head 650c of the first module 600a is aligned in the y-direction with the third servo head 650c of the second module 600b. The first, second, and third servo heads 650a, 650b, 650c of each module 600a, 600b are offset in the x-direction and the y-direction from the second row 562 of write heads 306.

Additionally, each module 600a, 600b comprises a fourth servo head 652a disposed adjacent to a second end 632 of the first row 560 of the plurality of read heads 308, a fifth servo head 652b disposed adjacent to the fourth servo head 652b, and a sixth servo head 652c disposed adjacent to the fifth servo head 652b. The fourth, fifth, and sixth servo heads 652a, 652b, 652c of each module 600a, 600b are aligned in the x-direction with the first row 560 of the plurality of read heads 308 and aligned in the x-direction with first, second, and third servo heads 650a, 650b, 650c. In other words, the plurality of read heads 308 are disposed between the first servo head 650a and the fourth servo head 652a.

The fourth servo head 652a is spaced a fourth distance 656a of about 20 μm to about 100 μm from the fifth servo head 652b, and is spaced a fifth distance 658b of about 20 μm to about 100 μm from an adjacent read head 308 disposed on the second end 632 of the first row 560. The fifth servo head 652b is spaced a sixth distance 656b of about 20 μm to about 100 μm from the sixth servo head 652c. The fourth distance 656a is substantially equal to the sixth distance 656b. The second distance 658a is substantially equal to the fifth distance 658b. In some embodiments, the first, third, fourth, and sixth distances 654a, 654b, 656a, 656b may be substantially equal.

The fourth servo head 652a of the first module 600a is aligned in the y-direction with the fourth servo head 652a of the second module 600b, the fifth servo head 652b of the first module 600a is aligned in the y-direction with the fifth servo head 652b of the second module 600b, and the sixth servo head 652c of the first module 600a is aligned in the y-direction with the sixth servo head 652c of the second module 600b. The fourth, fifth, and sixth servo heads 652a, 652b, 652c of each module 600a, 600b are offset in the x-direction and the y-direction from the second row 562 of write heads 306. However, in some embodiments, the first, second, and third servo heads 650a, 650b, 650c of each module 600a, 600b are spaced from fourth, fifth, and sixth servo heads 652a, 652b, 652c by the plurality of write heads 306, and are aligned with the second row 562 of write heads 306 in the x-direction rather than being aligned with the plurality of read heads 308 in the first row 560.

The first, second, third, fourth, fifth, and sixth servo heads 650a, 650b, 650c, 652a, 652b, 652c are individually configured to read servo data from servo tracks 542a, 542b, respectively, on a tape 544 to position the tape head 601 when writing data to and reading data from the tape 544. However, at least two servo heads 650a, 650b, 650c, 652a, 652b, 652c of each module 600a, 600b are configured to concurrently read servo data or servo patterns from the same servo track 542a, 542b.

The tape head 603 of FIG. 6C is the same as the tape head 601 of FIG. 6A; however the tape head 603 comprises one or more additional servo heads 651 between the plurality of read heads 308. The one or more additional servo heads 651 may be disposed in the middle of the total number of read heads 308. For example, in the embodiment shown in FIG. 6C, three additional servo heads 651 are disposed adjacent to three read heads 308 in the y-direction and three read heads in the −y-direction. It is to be noted that the number of additional servo heads 651, the number of read heads 308, and the number of write heads 306 are not intended to be limiting, but are for exemplary purposes only.

Moreover, in the tape head 603, the one or more additional servo heads 651 and the first, second, third, fourth, fifth, and sixth servo heads 650a, 650b, 650c, 652a, 652b, 652c are disposed in a third row 561 offset from the first row 560 and the second row 562. In one embodiment, the third row 561 may be centered between the first row 560 and the second row 562. In another embodiment, the third row 561 may be disposed closer to the first row 560 and further from the second row 562, or vice versa. In yet other embodiments, the third row 561 may be substantially aligned with either the first row 560 or the second row 562.

For example, as shown in FIG. 6B, the first and second servo heads 650a, 650b of each module 600a, 600b are configured to concurrently read servo data or servo patterns from the first servo track 542a when the tape 544 moves in the first direction 546, and the fifth and sixth servo heads 652b, 652c of each module 600a, 600b are configured to concurrently read servo data from the second servo track 542b when the tape 544 moves in the first direction 546. Due to the serpentine manner of writing and/or reading, one or more servo heads of each module 600a, 600b (e.g., the third servo head 650c and the fourth servo head 652a of each module 600a, 600b) may not be disposed over the servo tracks 542a, 542b when writing or reading data to the tape 544 as the tape 544 moves in the first direction 546.

Similarly, the second and third servo heads 650b, 650c of each module 600a, 600b are configured to concurrently read servo data or servo patterns from the first servo track 542a when the tape 544 moves in the second direction 548, and the fourth and fifth servo heads 652a, 652b of each module 600a, 600b are configured to concurrently read servo data from the second servo track 542b when the tape 544 moves in the second direction 548. Due to the serpentine manner of writing and/or reading, one or more servo heads of each module 600a, 600b (e.g., the first servo head 650a and the sixth servo head 652c) may not be disposed over the servo tracks 542a, 542b when writing or reading data to the tape 544 as the tape 544 moves in the second direction 548. Because the tape 544 moves in the third direction 547 prior to writing or reading in the inbound or second direction 548, the one or more servo heads of each module 600a, 600b that are not disposed over the servo tracks 542a, 542b when writing or reading data to the tape 544 in the inbound or second direction 548 may be different than the one or more servo heads of each module 600a, 600b that are not disposed over the servo tracks 542a, 542b when writing or reading data to the tape 544 in the outbound or first direction 546.

A controller, such as the controller 140 of FIGS. 1A-1C, or firmware executed on the controller or other controlling mechanism with the drive, is able to process the concurrently read servo data or servo patterns from the at least two servo heads 650a-652c concurrently reading the servo data or servo patterns from the same servo track 542a, 542b. In some embodiments, the controller 140 or firmware uses the spacing between the servo heads (i.e., the first, second, third, fourth, fifth, and sixth distances 654a, 658a, 654b, 656a, 658b, 656b) to compute the tape head 601 position information. Computing the position information of the tape head 601 increases the signal-to-noise ratio by about 3 dB, enabling more accurate track following, and thus, higher track densities. The position information of the tape head 601 may be computed (e.g., averaged) because the two servo heads 650a-652c that concurrently read servo data or servo patterns from the same servo track 542a, 542b are spaced far enough apart to ensure that the two magnetic media noise signatures are not correlated. The controller 140 or firmware then optionally dynamically adjusts a position of the tape head 601 based upon the processed servo data.

Moreover, the at least two servo heads 650a-652c configured to concurrently read servo data or servo patterns from the same servo track 542a, 542b further provide redundancy in the event one or more servo heads 650a-652c are temporarily non-functional. The at least two servo heads 650a-652c configured to concurrently read servo data or servo patterns from the same servo track 542a, 542b may also provide information regarding the state of the tape 544, such as local expansion or contraction within the servo tracks 542a, 542b, or any deformities of the tape 544 that occurred due to TDS effects. As such, the tape head 601 will be more accurately and precisely positioned for reading and writing data to the tape 544.

Figure 7A:
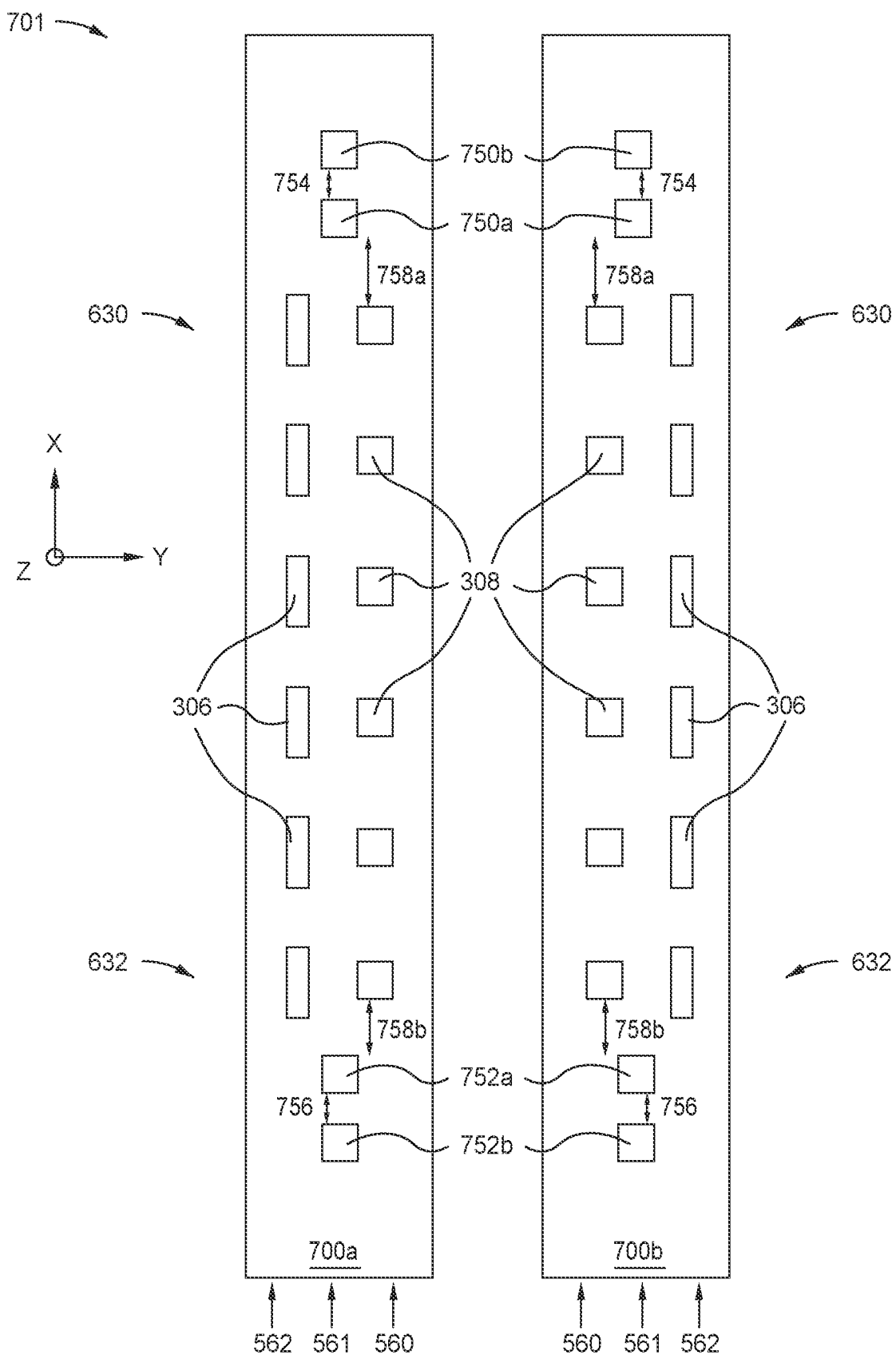
FIGS. 7A-7B illustrate MFS views of a tape head comprising a plurality of adjacent servo heads, according to another embodiment.
Figure 7B:
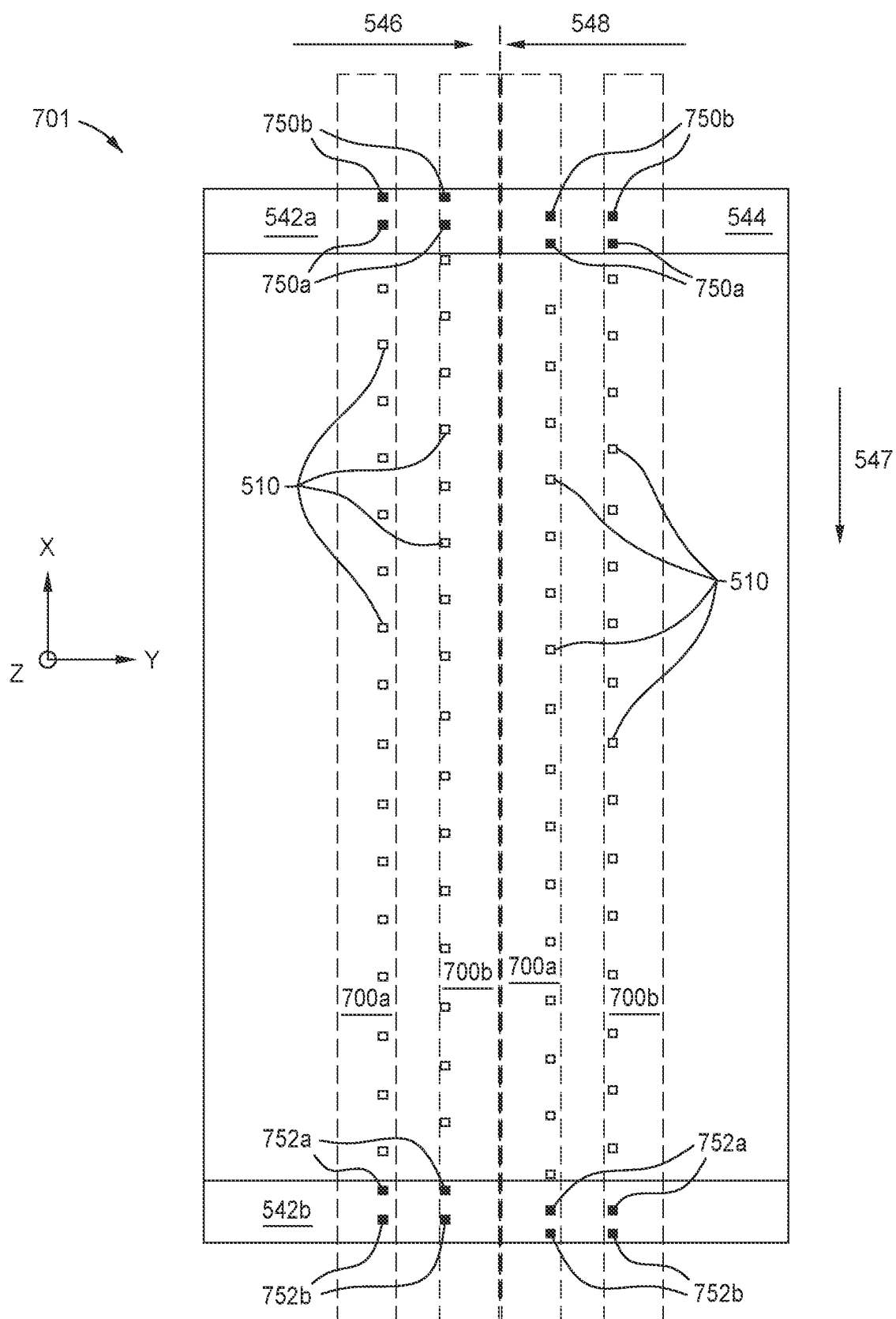

FIGS. 7A-7B illustrate MFS views of a tape head 701 comprising a plurality of adjacent servo heads, according to another embodiment. FIG. 7A illustrates a schematic tape head 701, while FIG. 7B illustrates the tape head 701 as a tape 544 moves over the tape head 701 in a first direction 546 and a second direction 548. The tape head 701 may be utilized within a tape drive comprising a controller, such as the TED or tape drive 100 comprising the controller 140 of FIGS. 1A-1C. The tape head 701 may be configured to enable upstream or downstream flying, as discussed above. Aspects of the tape head 701 may be used in combination with the tape head 601 of FIGS. 6A and 6C, or the tape head 603 of FIG. 6C. For example, the tape head 701 may comprise the one or more additional servo heads 651.

The tape head 701 comprises a first module 700a and a second module 700b. While two modules 700a, 700b are shown, the tape head 701 may comprise only one module in some embodiments. Each module 700a, 700b may be the SGV module 300 shown in FIG. 3A or the SGV module 350 shown in FIG. 3B configured to concurrently write data to and read data from the tape 544. The modules 700a, 700b may be in a form similar to the generalized tape head module assembly 200 of FIG. 2 or a portion of it, but with their unique features and arrangements according to various embodiments.

Each module 700a, 700b comprises a plurality of read heads 308 disposed in a first row 560 and a plurality of write heads 306 disposed in a second row 562 adjacent to the first row 560. Each of the plurality of write heads 308 is aligned with an adjacent read head 308 in the y-direction. One read head 308 and one write head 306 pair may be referred to as a data head 510. Thus, as shown in FIG. 7B, each module 700a, 700b comprises a plurality of data heads 510. The plurality of read heads 308 may be the read head 308 of FIGS. 3A-3B, and the plurality of write heads 306 may be the write head 306 of FIGS. 3A-3B. While each module 700a, 700b is shown comprising six write heads 306 and six read heads 308, the modules 700a, 700b may comprise any number of write heads 306 and read heads 308, and thus, the number of write heads 306 and read heads 308 is not intended to be limiting.

Each module 700a, 700b further comprises a first servo head 750a disposed adjacent to a first end 630 of a third row 561 and a second servo head 750b disposed adjacent to the first servo head 650a. The first servo head 750a is spaced a first distance 754 of about 20 μm to about 100 μm from the second servo head 750b, and is spaced a second distance 758a of about 20 μm to about 100 μm from an adjacent read head 308 disposed on the first end 630 of the first row 560.

The first servo head 750a of the first module 700a is aligned in the y-direction with the first servo head 750a of the second module 700b, and the second servo head 750b of the first module 700a is aligned in the y-direction with the second servo head 750b of the second module 700b. The first and second servo heads 750a, 750b of each module 700a, 700b are offset in the x-direction and the y-direction from the second row 562 of write heads 306 and the first row 560 of read heads 308.

Additionally, each module 700a, 700b comprises a third servo head 7 disposed adjacent to a second end 632 of the third row 561 and a fourth servo head 752b disposed adjacent to the fourth servo head 652b. The third and fourth servo heads 752a, 752b of each module 700a, 700b are aligned in the x-direction with first and second servo heads 750a, 750b. The plurality of read heads 308 and the plurality of write heads 306 are disposed between the first servo head 650a and the fourth servo head 652a.

The third servo head 752a is spaced a third distance 756 of about 20 μm to about 100 μm from the fourth servo head 752b, and is spaced a fourth distance 758b of about 20 μm to about 100 μm from an adjacent read head 308 disposed on the second end 632 of the first row 560. The second distance 758a is substantially equal to the fourth distance 758b. In some embodiments, the first and third distances 754, 756 may be substantially equal.

The third servo head 752a of the first module 700a is aligned in the y-direction with the third servo head 752a of the second module 700b, and the fourth servo head 752b of the first module 700a is aligned in the y-direction with the fourth servo head 752b of the second module 700b. The third and fourth servo heads 752a, 752b of each module 700a, 700b are offset in the x-direction and the y-direction from the second row 562 of write heads 306 and the first row 560 of read heads 308. In one embodiment, the third row 561 may be centered between the first row 560 and the second row 562. In another embodiment, the third row 561 may be disposed closer to the first row 560 and further from the second row 562, or vice versa. In yet other embodiments, the third row 561 may be substantially aligned with either the first row 560 or the second row 562.

The first, second, third, and fourth servo heads 750a, 750b, 752a, 752b are individually configured to read servo data from servo tracks 542a, 542b, respectively, on a tape 544 to position the tape head 701 when writing data to and reading data from the tape 544. However, at least two servo heads 750a, 750b, 752a, 752b of each module 700a, 700b are configured to concurrently read servo data or servo patterns from the same servo track 542a, 542b. For example, as shown in FIG. 7B, the first and second servo heads 750a, 750b of each module 700a, 700b are configured to concurrently read servo data or servo patterns from the first servo track 542a when the tape 544 moves in the first direction 546, and the third and fourth servo heads 752a, 752b of each module 700a, 700b are configured to concurrently read servo data from the second servo track 542b when the tape 544 moves in the first direction 546.

Similarly, the first and second servo heads 750a, 750b of each module 700a, 700b are configured to concurrently read servo data or servo patterns from the first servo track 542a when the tape 544 moves in the second direction 548, and the third and fourth servo heads 752a, 752b of each module 700a, 700b are configured to concurrently read servo data from the second servo track 542b when the tape 544 moves in the second direction 548. Due to the serpentine manner of writing and/or reading and the tape 544 moving in the third direction 547 prior to writing or reading in the inbound or second direction 548, the first, second, third, and fourth servo heads 750a-752b may be disposed at different portions on the first and second servo tracks 542a, 542b when moving in the inbound or first direction 546 and the outbound or second direction 548.

A controller, such as the controller 140 of FIGS. 1A-1C, or firmware executed on the controller or other controlling mechanism with the drive, is able to process the concurrently read servo data or servo patterns from the at least two servo heads 750a-752b concurrently reading the servo data or servo patterns from the same servo track 542a, 542b. In some embodiments, the controller 140 or firmware uses the spacing between the servo heads (i.e., the first, second, third, and fourth, distances 754, 758a, 756, 758b) to compute the tape head 701 position information. Computing the position information of the tape head 701 increases the signal-to-noise ratio by about 3 dB, enabling more accurate track following, and thus, higher track densities. The position information of the tape head 701 may be computed because the two servo heads 750a-752b that concurrently read servo data or servo patterns from the same servo track 542a, 542b are spaced far enough apart to ensure that the two magnetic media noise signatures are not correlated. The controller 140 or firmware then optionally dynamically adjusts a position of the tape head 701 based upon the processed servo data.

Moreover, the at least two servo heads 750a-752b configured to concurrently read servo data or servo patterns from the same servo track 542a, 542b further provide redundancy in the event one or more servo heads 750a-752b are temporarily non-functional. The at least two servo heads 750a-752b configured to concurrently read servo data or servo patterns from the same servo track 542a, 542b may also provide information regarding the state of the tape 544, such as local expansion or contraction within the servo tracks 542a, 542b, or any deformities of the tape 544 that occurred due to TDS effects. As such, the tape head 701 will be more accurately and precisely positioned for reading and writing data to the tape 544.

Figure 8A:
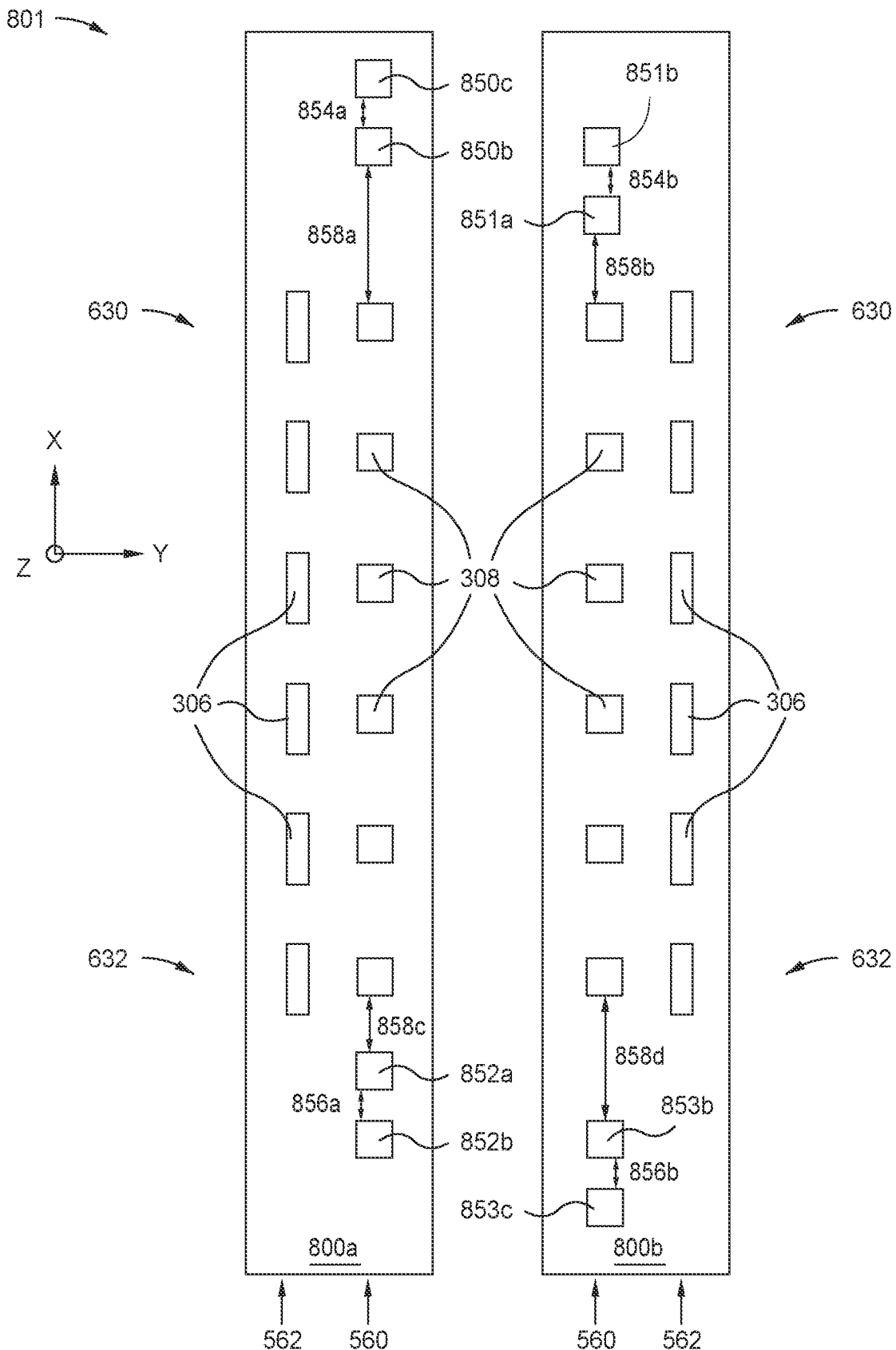
FIGS. 8A-8B illustrate MFS views of a tape head comprising a plurality of adjacent servo heads, according to yet another embodiment.
Figure 8B:
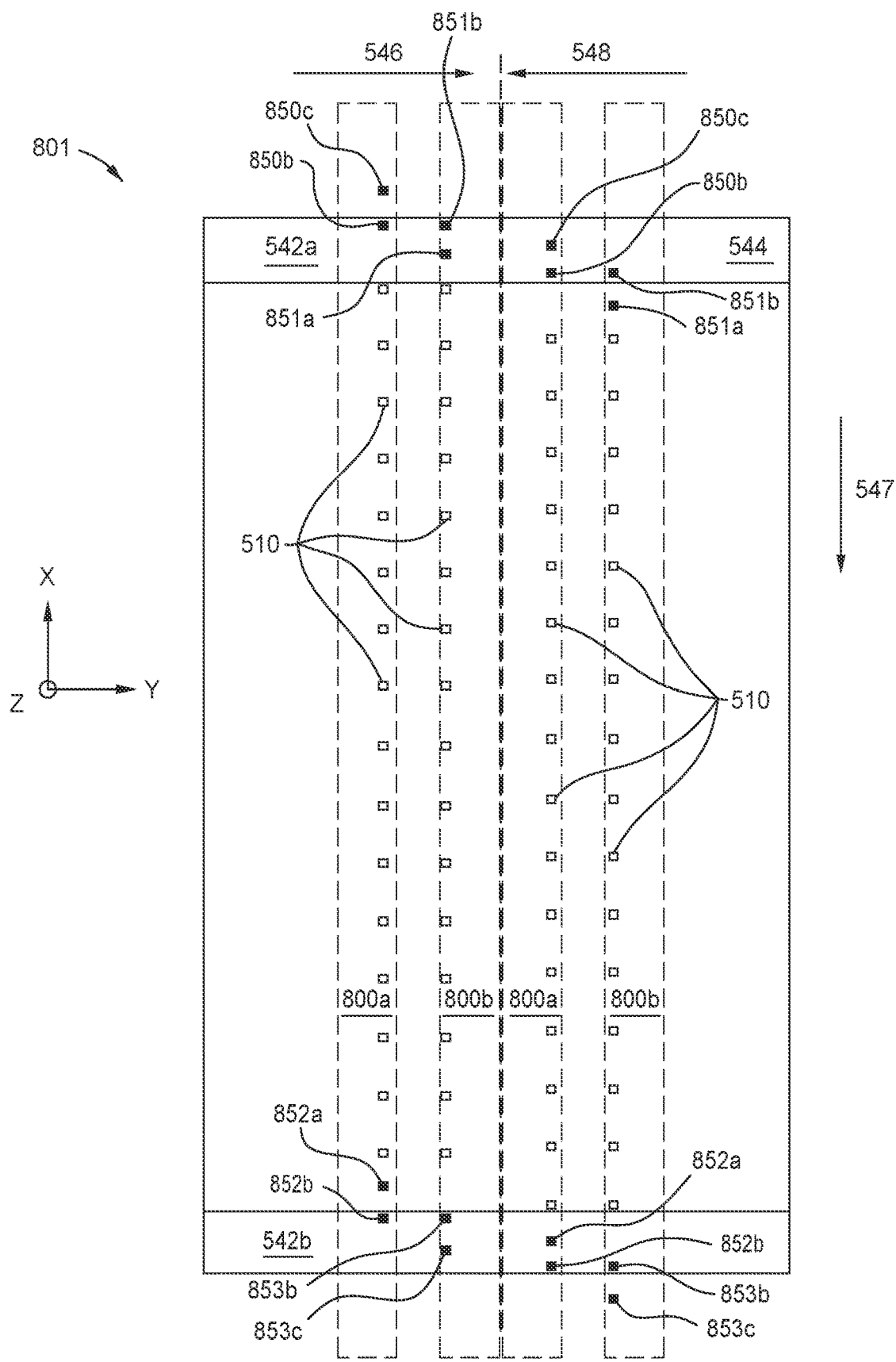

FIGS. 8A-8B illustrate MFS views of a tape head 801 comprising a plurality of adjacent servo heads, according to yet another embodiment. FIG. 8A illustrates a schematic tape head 801, while FIG. 8B illustrates the tape head 801 as a tape 544 moves over the tape head 801 in a first direction 546 and a second direction 548. The tape head 801 may be utilized within a tape drive comprising a controller, such as the TED or tape drive 100 comprising the controller 140 of FIGS. 1A-1C. The tape head 801 may be configured to enable upstream or downstream flying, as discussed above. Aspects of the tape head 801 may be used in combination with the tape head 601 of FIGS. 6A and 6C, the tape head 603 of FIG. 6C, or the tape head 701 of FIGS. 7A-7B. For example, the tape head 801 may comprise the one or more additional servo heads 651, or the first, second, third, and fourth, servo heads 850b, 850c, 851a, 851b, 852a, 852b, 853b, 853c of the tape head 801 may be disposed in a third row 561 offset from the first row 560 and/or the second row 562.

The tape head 801 comprises a first module 800a and a second module 800b. While two modules 800a, 800b are shown, the tape head 801 may comprise only one module in some embodiments. Each module 800*a*, 800*b* may be the SGV module 300 shown in FIG. 3A or the SGV module 350 shown in FIG. 3B configured to concurrently write data to and read data from the tape 544. The modules 800*a*, 800*b* may be in a form similar to the generalized tape head module assembly 200 of FIG. 2 or a portion of it, but with their unique features and arrangements according to various embodiments.

Each module 800*a*, 800*b* comprises a plurality of read heads 308 disposed in a first row 560 and a plurality of write heads 306 disposed in a second row 562 adjacent to the first row 560. Each of the plurality of write heads 308 is aligned with an adjacent read head 308 in the y-direction. One read head 308 and one write head 306 pair may be referred to as a data head 510. Thus, as shown in FIG. 8B, each module 800*a*, 800*b* comprises a plurality of data heads 510. The plurality of read heads 308 may be the read head 308 of FIGS. 3A-3B, and the plurality of write heads 306 may be the write head 306 of FIGS. 3A-3B. While each module 800*a*, 800*b* is shown comprising six write heads 306 and six read heads 308, the modules 800*a*, 800*b* may comprise any number of write heads 306 and read heads 308, and thus, the number of write heads 306 and read heads 308 is not intended to be limiting.

The first module 800*a* further comprises a first servo head 850*b* disposed adjacent to a first end 630 of the first row 560 of the plurality of read heads 308 and a second servo head 850*c* disposed adjacent to the first servo head 850*b*. The first and second servo heads 850*b*, 850*c* of the first module 800*a* are aligned in the x-direction with the first row 560 of the plurality of read heads 308. The second module 800*b* further comprises a first servo head 851*a* disposed adjacent to a first end 630 of the first row 560 of the plurality of read heads 308 and a second servo head 851*b* disposed adjacent to the first servo head 851*a*. The first and second servo heads 851*a*, 851*b* of the second module 800*b* are aligned in the x-direction with the first row 560 of the plurality of read heads 308.

The first servo head 850*b* of the first module 800*a* is spaced a first distance 854*a* of about 20 μm to about μpm from the second servo head 850*c* of the first module 800*a*, and is spaced a second distance 858*a* of about 30 μm to about 100 μm from an adjacent read head 308 of the first module 800*a* disposed on the first end 630 of the first row 560. The first servo head 851*a* of the second module 800*b* is spaced a third distance 854*b* of about 20 μm to about 100 μm from the second servo head 851*b* of the second module 800*b*, and is spaced a fourth distance 858*b* of about 20 μm to about 90 μm from an adjacent read head 308 of the second module 800*b* disposed on the first end 630 of the first row 560. The first distance 854*a* is about equal to the third distance 854*b*. The second distance 858*a* is greater than the fourth distance 858*b*.

The first servo head 850*b* of the first module 800*a* is aligned in the y-direction with the second servo head 851*b* of the second module 800*b*. The second servo head 850*c* of the first module 800*a* is offset in the y-direction from the second servo head 851*b* of the second module 800*b*, and the first servo head 851*a* of the second module 800*b* is offset in the −y-direction from the first servo head 850*b* of the first module 600*a*. The first and second servo heads 850*b*, 850*c*, 851*a*, 851*b* of each module 800*a*, 800*b* are offset in the x-direction and the y-direction from the second row 562 of write heads 306.

Additionally, the first module 800*a* comprises a third servo head 852*a* disposed adjacent to a second end 632 of the first row 560 of the plurality of read heads 308 and a fourth servo head 852*b* disposed adjacent to the third servo head 852*a*. The third and fourth servo heads 852*a*, 852*b* of the first module 800*a* are aligned in the x-direction with the first row 560 of the plurality of read heads 308. In other words, the plurality of read heads 308 of the first module 800*a* are disposed between the first servo head 850*b* and the third servo head 852*a*. The second module 800*b* further comprises a third servo head 853*b* disposed adjacent to a second end 632 of the first row 560 of the plurality of read heads 308 and a fourth servo head 853*c* disposed adjacent to the third servo head 853*b*. The third and fourth servo heads 853*b*, 853*c* of the second module 800*b* are aligned in the x-direction with the first row 560 of the plurality of read heads 308. In other words, the plurality of read heads 308 of the second module 800*b* are disposed between the first servo head 851*a* and the third servo head 853*b*.

The fourth servo head 852*b* of the first module 800*a* is aligned in the y-direction with the third servo head 853*b* of the second module 800*b*. The first servo head 852*a* of the first module 800*a* is offset in the y-direction from the third servo head 853*b* of the second module 800*b*, and the fourth servo head 853*c* of the second module 800*b* is offset in the −y-direction from the fourth servo head 852*b* of the first module 600*a*. The third and fourth servo heads 852*a*, 852*b*, 853*b*, 853*c* of each module 800*a*, 800*b* are offset in the x-direction and the y-direction from the second row 562 of write heads 306. However, in some embodiments, the first and second, servo heads 850*b*-851*b* of each module 800*a*, 800*b* are spaced from third and fourth servo heads 852*a*-853*c* of each module 800*a*, 800*b* by the plurality of write heads 306, and are aligned with the second row 562 of write heads 306 in the x-direction rather than being aligned with the plurality of read heads 308 in the first row 560.

The third servo head 852*a* of the first module 800*a* is spaced a fifth distance 856*a* of about 20 μm to about 100 μm from the fourth servo head 852*b* of the first module 800*a*, and is spaced a sixth distance 858*c* of about 20 μm to about 90 μm from an adjacent read head 308 of the first module 800*a* disposed on the second end 632 of the first row 560. The third servo head 853*b* of the second module 800*b* is spaced a seventh distance 856*b* of about 20 μm to about 100 μm from the fourth servo head 853*c* of the second module 800*b*, and is spaced an eighth distance 858*d* of about 30 μm to about 100 μm from an adjacent read head 308 of the second module 800*b* disposed on the second end 632 of the first row 560. The fifth distance 856*a* is about equal to the seventh distance 856*b*. The sixth distance 858*c* is less than the eighth distance 854*d*. The second distance 858*a* is about equal to the eighth distance 858*d*, and the fourth distance 858*b* is about equal to the sixth distance 858*c*.

The first, second, third, and fourth, servo heads 850*b*, 850*c*, 851*a*, 851*b*, 852*a*, 852*b*, 853*b*, 853*c* of each module 800*a*, 800*b* are individually configured to read servo data from servo tracks 542*a*, 542*b*, respectively, on a tape 544 to position the tape head 801 when writing data to and reading data from the tape 544. However, at least two servo heads 850*b*, 850*c*, 851*a*, 851*b*, 852*a*, 852*b*, 853*b*, 853*c* of each module 800*a*, 800*b* are configured to concurrently read servo data or servo patterns from the same servo track 542*a*, 542*b*.

For example, as shown in FIG. 8B, the first and second servo heads 851*a*, 851*b* of the second module 800*b* are configured to concurrently read servo data or servo patterns from the first servo track 542*a* when the tape 544 moves in the first direction 546, and the third and fourth servo heads 853*b*, 853*c* of the second module 800*b* are configured to concurrently read servo data from the second servo track 542b when the tape 544 moves in the first direction 546. Due to the serpentine manner of writing and/or reading, one or more servo heads of at least one module 800a, 800b (e.g., the second servo head 850c of the first module 800a and the third servo head 852a of the first module 800a) may not be disposed over the servo tracks 542a, 542b when writing or reading data to the tape 544 as the tape 544 moves in the first direction 546.

Similarly, the first and second servo heads 850b, 850c of the first module 800a are configured to concurrently read servo data or servo patterns from the first servo track 542a when the tape 544 moves in the second direction 548, and the third and fourth servo heads 852a, 852b of the first module 800a are configured to concurrently read servo data from the second servo track 542b when the tape 544 moves in the second direction 548. Due to the serpentine manner of writing and/or reading, one or more servo heads of at least one module 800a, 800b (e.g., the first servo head 851a of the second module 800b and the fourth servo head 653c of the second module 800b) may not be disposed over the servo tracks 542a, 542b when writing or reading data to the tape 544 as the tape 544 moves in the second direction 548. Because the tape 544 moves in the third direction 547 prior to writing or reading in the inbound or second direction 548, the one or more servo heads of each module 800a, 800b that are not disposed over the servo tracks 542a, 542b when writing or reading data to the tape 544 in the inbound or second direction 548 may be different than the one or more servo heads of each module 800a, 800b that are not disposed over the servo tracks 542a, 542b when writing or reading data to the tape 544 in the outbound or first direction 546.

A controller, such as the controller 140 of FIGS. 1A-1C, or firmware executed on the controller or other controlling mechanism with the drive, is able to process the concurrently read servo data or servo patterns from the at least two servo heads 850b-853c concurrently reading the servo data or servo patterns from the same servo track 542a, 542b. In some embodiments, the controller 140 or firmware uses the spacing between the servo heads (i.e., the first, second, third, fourth, fifth, sixth, seventh, and eighth distances 854a, 858a, 854b, 858b, 856a, 858c, 856b, 858d) to compute the tape head 801 position information. Computing the position information of the tape head 801 increases the signal-to-noise ratio by about 3 dB, enabling more accurate track following, and thus, higher track densities. The position information of the tape head 801 may be computed because the two servo heads 850b-853c that concurrently read servo data or servo patterns from the same servo track 542a, 542b are spaced far enough apart to ensure that the two magnetic media noise signatures are not correlated. The controller 140 or firmware then optionally dynamically adjusts a position of the tape head 801 based upon the processed servo data.

Moreover, the at least two servo heads 850b-853c configured to concurrently read servo data or servo patterns from the same servo track 542a, 542b further provide redundancy in the event one or more servo heads 850b-853c are temporarily non-functional. The at least two servo heads 850b-853c configured to concurrently read servo data or servo patterns from the same servo track 542a, 542b may also provide information regarding the state of the tape 544, such as local expansion or contraction within the servo tracks 542a, 542b, or any deformities of the tape 544 that occurred due to TDS effects. As such, the tape head 801 will be more accurately and precisely positioned for reading and writing data to the tape 544.

Figure 9A:
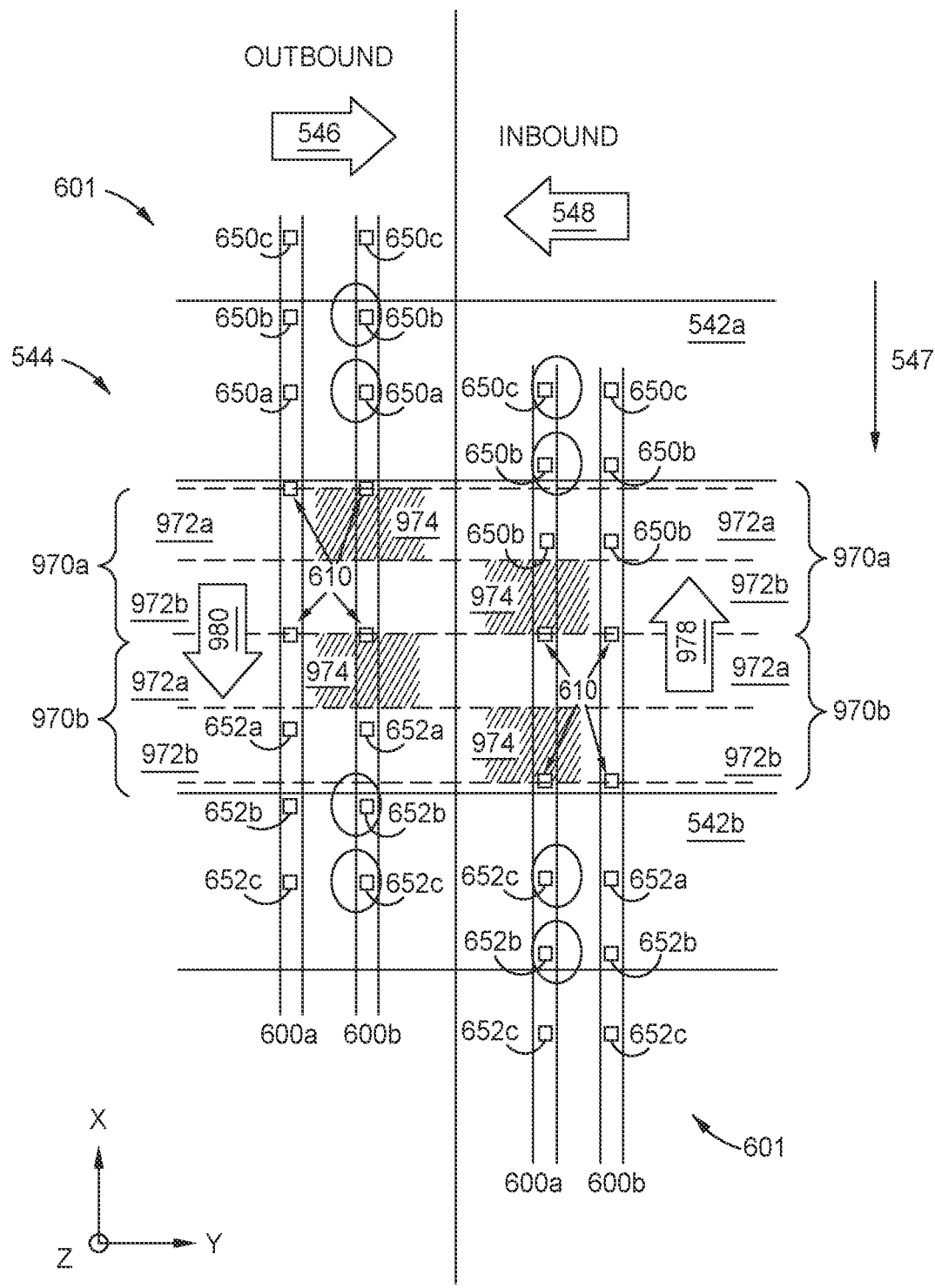
FIGS. 9A-9B illustrate how the various servo heads of the tape head of FIG. 6 function concurrently, according to various embodiments.
Figure 9B:
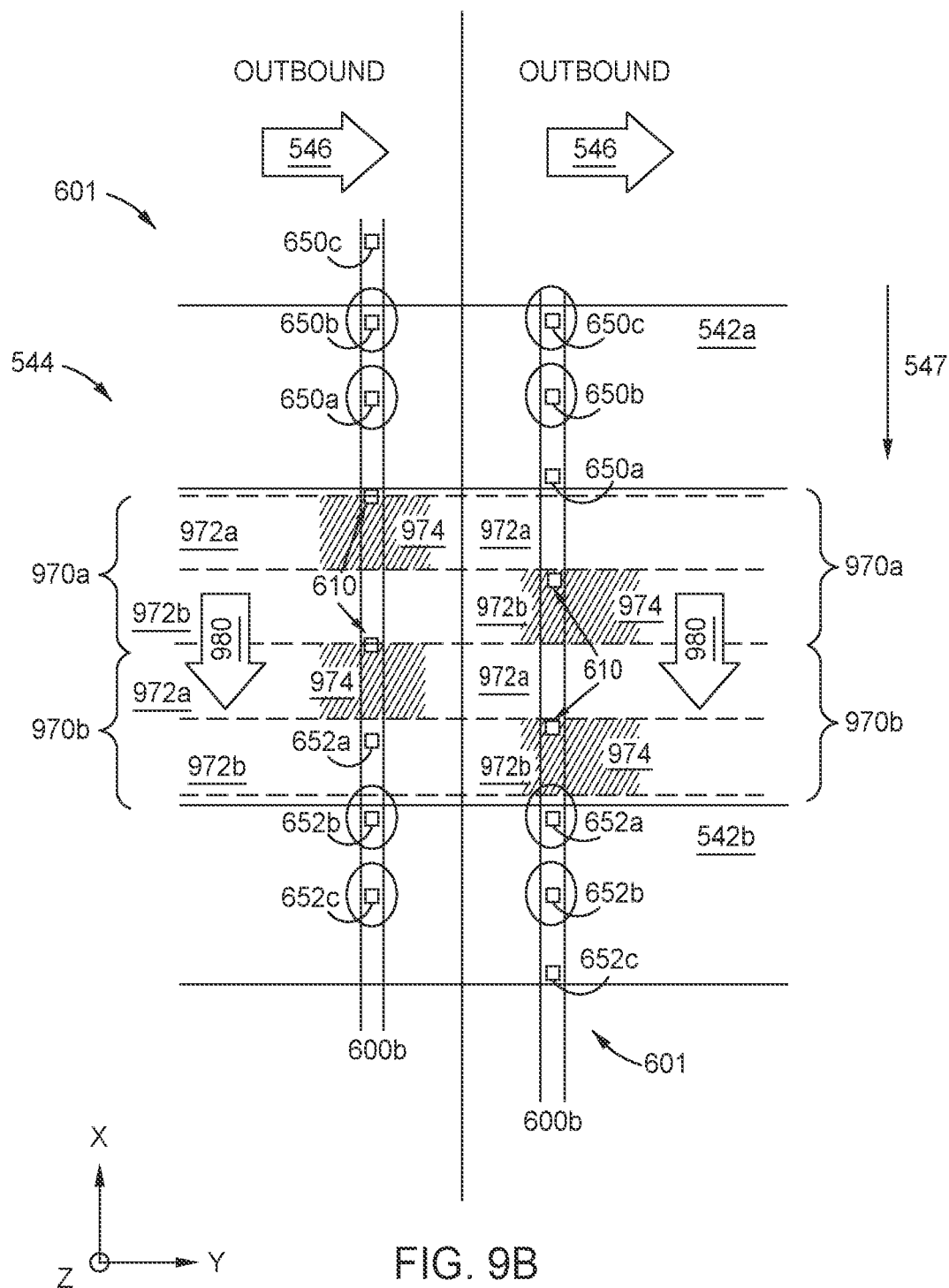

FIGS. 9A-9B illustrate how the various servo heads of the tape head 601 of FIG. 6 function concurrently, according to various embodiments. FIG. 9A illustrates a tape 544 moving in both the first or outbound direction 546 and the second or inbound direction 548 across the tape head 601 in a serpentine manner. FIG. 9B illustrates the tape 544 moving in only the first or outbound direction 546 across one module 600b of the tape head 601 in a serpentine manner. While FIGS. 9A-9B illustrate the tape head 601 of FIG. 6, the tape head 701 of FIGS. 7A-7B and the tape head 801 of FIGS. 8A-8B function similarly. Thus, FIGS. 9A-9B may apply to the tape heads 701 and 801 of FIGS. 7A-8B. Moreover, while the modules 600a, 600b of the tape head 601 shown in FIGS. 9A-9B comprise only two data heads 610, each module 600a, 600b may comprise a greater number of data heads 610, as discussed above.

In FIGS. 9A-9B, the tape 544 comprises a first servo track 542a and a second servo track 542b, each servo track 542a, 542b comprising servo patterns and servo data, as discussed further below in FIGS. 10A-11C. The tape 544 further comprises two data tracks 970a, 970b to which data 974 may be written to and read from using the tape head 601. While two data tracks 970a, 970b are shown, the tape 544 may comprise a plurality of data tracks 970. As such, the tape 544 is not limited to including only two data tracks 970a, 970b. Each data track 970a, 970b comprises an upper half sub-band 972a and a lower half sub-band 972b.

In FIG. 9A, as the tape 544 moves over the tape head 601 in the outbound direction 546 (i.e., the y-direction), the data heads 610 of the second module 600b write shingled data 974 in a direction 980 (i.e., shingling downwards in the −x-direction) to the upper half-band 972a of each data track 970a, 970b. The first module 600a does not write data 974 to the tape 544 as the tape moves in the outbound direction 546. The first servo head 650a and the second servo head 650b of the second module 600b concurrently read the servo data or servo patterns from the first servo track 542a, and the fifth data head 652b and the sixth data head 652c of the second module 600b concurrently read the servo data or servo patterns from the second servo track 542b in order to accurately position the tape head 601 for writing the shingled data 974.

The first servo head 650a may read to a lower half sub-band of the first servo track 542a, and the second servo head 650b may read to an upper half sub-band of the first servo track 542a, as discussed further below in FIGS. 10A-10C. Similarly, the fifth servo head 652b may read to an upper half sub-band of the second servo track 542b, and the sixth servo head 652c may read to a lower half sub-band of the second servo track 542b. The third servo head 650c and the fourth servo head 652a of the second module 600b are not utilized.

The controller, such as the controller 140 of FIGS. 1A-1C, or firmware, is then able to process the concurrently read servo data or servo patterns from the first, second, fifth, and sixth servo heads 650a, 650b, 652b, 652c. In some embodiments, as discussed above, the controller 140 or firmware uses the spacing between the servo heads to compute the tape head 601 position information.

The tape 544 then moves in the third direction 547 to align with the lower half-band 972b of each data track 970, 970b, and the tape 544 moves over the tape head 601 in the inbound direction 548 (i.e., the −y-direction). The data heads 610 of the first module 600a then write shingled data 974 in a direction 978 (i.e., shingling upwards in the x-direction) to the lower half-band 972b of each data track 970a, 970b. The second module 600b does not write data 974 to the tape 544 as the tape moves in the inbound direction 548. The second servo head 650b and the third servo head 650c of the first module 600a concurrently read the servo data or servo patterns from the first servo track 542a, and the fourth data head 652a and the fifth data head 652b of the first module 600a concurrently read the servo data or servo patterns from the second servo track 542b in order to accurately position the tape head 601 for writing the shingled data 974.

The second servo head 650b may read to a lower half sub-band of the first servo track 542a, and the third servo head 650c may read to an upper half sub-band of the first servo track 542a, as discussed further below in FIGS. 10A-10C. Similarly, the fourth servo head 652a may read to an upper half sub-band of the second servo track 542b, and the fifth servo head 652b may read to a lower half sub-band of the second servo track 542b. The first servo head 650a and the sixth servo head 652c of the first module 600a are not utilized.

The controller, such as the controller 140 of FIGS. 1A-1C, or firmware, is then able to process the concurrently read servo data or servo patterns from the second, third, fourth, and fifth servo heads 650b, 650c, 652a, 652b. In some embodiments, as discussed above, the controller 140 or firmware uses the spacing between the servo heads to compute the tape head 601 position information.

The tape 544 may continue moving back and forth over the tape head 601 in the outbound direction 546 and inbound direction 548 as needed, and the process shown in FIG. 9A may be repeated one or more times to continue writing shingled data to the tape 544.

FIG. 9B illustrates the tape 544 moving in only the first or outbound direction 546 across one module 600b of the tape head 601 in a serpentine manner. In FIG. 9B, as the tape 544 moves over the tape head 601 in the outbound direction 546 (i.e., the y-direction), the data heads 610 of the module 600b write shingled data 974 in a direction 980 (i.e., shingling downwards in the −x-direction) to the upper half-band 972a of each data track 970a, 970b. The first servo head 650a and the second servo head 650b concurrently read the servo data or servo patterns from the first servo track 542a, and the fifth data head 652b and the sixth data head 652c concurrently read the servo data or servo patterns from the second servo track 542b in order to accurately position the tape head 601 for writing the shingled data 974.

The first servo head 650a may read to a lower half sub-band of the first servo track 542a, and the second servo head 650b may read to an upper half sub-band of the first servo track 542a, as discussed further below in FIGS. 10A-10C. Similarly, the fifth servo head 652b may read to an upper half sub-band of the second servo track 542b, and the sixth servo head 652c may read to a lower half sub-band of the second servo track 542b. The third servo head 650c and the fourth servo head 652a of the second module 600b are not utilized.

The controller, such as the controller 140 of FIGS. 1A-1C, or firmware, is then able to process the concurrently read servo data or servo patterns from the first, second, fifth, and sixth servo heads 650a, 650b, 652b, 652c. In some embodiments, as discussed above, the controller 140 or firmware uses the spacing between the servo heads to compute the tape head 601 position information.

The tape 544 then re-reels to the starting position and moves in the third direction 547 to align with the lower half-band 972b of each data track 970, 970b. The tape 544 then moves over the tape head 601 in the outbound direction 546 (i.e., the y-direction) once again, and the data heads 610 of the module 600b write shingled data 974 in a direction 980 (i.e., shingling downwards in the −x-direction) to the lower half-band 972b of each data track 970a, 970b. The second servo head 650b and the third servo head 650c concurrently read the servo data or servo patterns from the first servo track 542a, and the fourth servo head 652a and the fifth data head 652b concurrently read the servo data or servo patterns from the second servo track 542b in order to accurately position the tape head 601 for writing the shingled data 974.

The second servo head 650b may read to a lower half sub-band of the first servo track 542a, and the third servo head 650c may read to an upper half sub-band of the first servo track 542a, as discussed further below in FIGS. 10A-10C. Similarly, the fourth servo head 652a may read to an upper half sub-band of the second servo track 542b, and the fifth servo head 652b may read to a lower half sub-band of the second servo track 542b. The first servo head 650a and the sixth servo head 652c of the second module 600b are not utilized.

The controller, such as the controller 140 of FIGS. 1A-1C, or firmware, is then able to process the concurrently read servo data or servo patterns from the second, third, fourth and fifth, servo heads 650b, 650c, 652a, 652b. In some embodiments, as discussed above, the controller 140 or firmware uses the spacing between the servo heads to compute the tape head 601 position information.

The tape 544 may continue to re-reel and move back over the tape head 601 in the outbound direction 546 as needed, and the process shown in FIG. 9B may be repeated one or more times to continue writing shingled data to the tape 544.

Figure 10A:
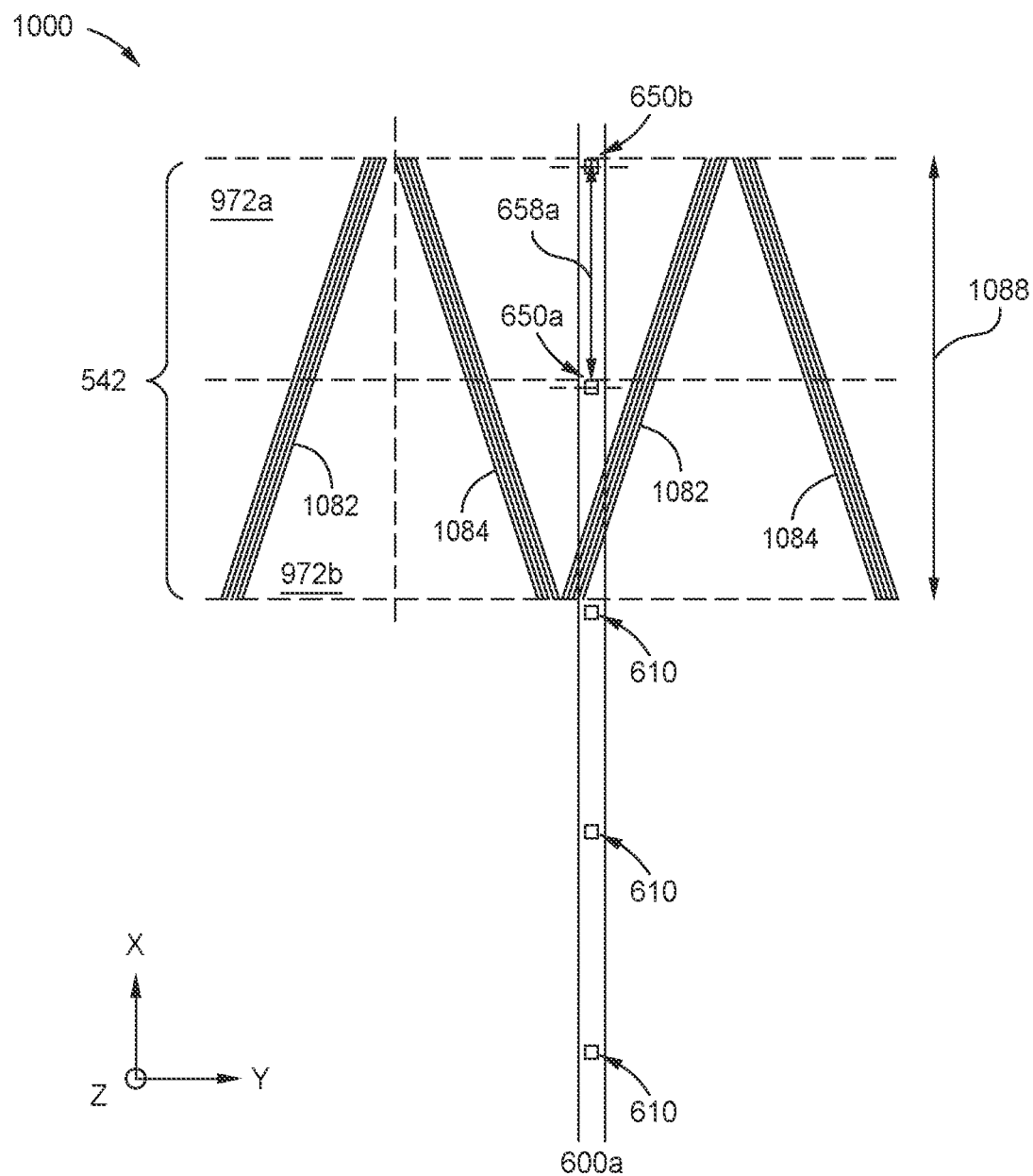

FIGS. 10A-10C illustrate various types of servo patterns 1000, 1050, 1075, respectively, that may be written to a servo tracks, according to various embodiments. The servo patterns 1000, 1050, 1075 may be written to the servo tracks 542a, 542b of the tape 544 of FIGS. 6A-9B. The servo patterns 1000, 1050, 1075 may be read by any of the tape heads 601, 701, 801 of FIGS. 6A-8B. The tape head 601 of FIGS. 6A-6B is illustrated over the servo patterns 1000, 1050, 1075 of FIGS. 10A-10C.

FIG. 10A illustrates a servo pattern 1000 written to a servo track 542 of a tape (not shown), according to one embodiment. The servo pattern 1000 comprises a first set of one or more lines 1082 directed in the yx-direction. The first set of lines 1082 span from a bottom of the lower half sub-band 972b of the servo track 542 to a top of the upper half sub-band 972a. The servo pattern 1000 then comprises a second set of one or more lines 1084 directed in the −yx-direction. The first set of lines 1082 span from the top of the upper half sub-band 972a of the servo track 542 to the bottom of the lower half sub-band 972b. The first and second sets of one or more lines 1082, 1084 collectively form an inverted or upside down "V"-like shape. The first and second sets of one or more lines 1082, 1084 then alternatingly repeat across the servo track 542 such that the first and second sets of one or more lines 1082, 1084 form a plurality of "M"-like or chevron shapes spanning from the bottom of the lower half sub-band 972b of the servo track 542 to the top of the upper half sub-band 972a.

The servo pattern 1000 has a height 1088 in the x-direction that is greater than the distance 658a between the first and second servo heads 650a, 650b. In some embodiments, a first servo head, such as the first servo head 650a of the first module 600a of the tape head 601 of FIGS. 6A-6B, is configured to read the servo pattern 1000 disposed within the lower half sub-band 972b, and a second servo head, such as the second servo head 650b of the first module 600a, is configured to concurrently read the servo pattern 1000 disposed within the upper half sub-band 972a.

FIG. 10B illustrates a servo pattern 1050 written to a servo track 542 of a tape (not shown), according to another embodiment. The servo pattern 1050 of FIG. 10B is similar to the servo pattern 1000 of FIG. 10A; however, the first and second sets of one or more lines 1082, 1084 span the lower half sub-band 972b and the upper half sub-band 972a independently (i.e., the first and second sets of one or more lines 1082, 1084 are contained within each half sub-band 972a, 972b independently).

As such, the lower half sub-band 972b comprises the first and second sets of one or more lines 1082, 1084 forming a first plurality of "M"-like shapes, and the upper half sub-band 972a comprises the first and second sets of one or more lines 1082, 1084 forming a second plurality of "M"-like or chevron shapes such that the upper and lower half sub-bands 972a, 972b are identical to one another. In other words, the first and second sets of one or more lines 1082, 1084 of the servo pattern 1050 are half as long as the first and second sets of one or more lines 1082, 1084 of the servo pattern 1000.

The servo pattern 1000 has a height 1088 in the x-direction that is greater than the distance 658a between the first and second servo heads 650a, 650b. In some embodiments, a first servo head, such as the first servo head 650a of the first module 600a of the tape head 601 of FIGS. 6A-6B, is configured to read the servo pattern 1050 disposed within the lower half sub-band 972b, and a second servo head, such as the second servo head 650b of the first module 600a, is configured to concurrently read the servo pattern 1050 disposed within the upper half sub-band 972a.

FIG. 10C illustrates a servo pattern 1075 written to a servo track 542 of a tape (not shown), according to another embodiment. The servo pattern 1075 of FIG. 10C is similar to the servo pattern 1050 of FIG. 10B; however, the upper and lower half sub-bands 972a, 972b of the servo track 542 are mirror images of one another. As such, the upper half sub-band 972a comprises the first and second sets of one or more lines 1082, 1084 forming a plurality of inverted or upside down "V"-like, or repeating one or more times to form a plurality of "M"-like shapes. The lower half sub-band 972b comprises a third set of one or more lines 1083 directed from a top of the lower half sub-band 972b to the bottom of the lower half sub-band 972b in the –yx-direction, and a fourth set of one or more lines 1085 directed from the bottom of the lower half sub-band 972b to the top of the lower half sub-band 972b in the yx-direction.

The third and fourth sets of one or more lines 1083, 1085 collectively form a "V"-like shape. The third and fourth sets of one or more lines 1083, 1085 then alternatingly repeat across the servo track 542 such that the third and fourth sets of one or more lines 1083, 1085 form a plurality of "W"-like shapes spanning from the top of the lower half sub-band 972b of the servo track 542 to the bottom of the lower half sub-band 972b. Collectively, the first, second, third, and fourth sets of one or more lines 1082-1085 form a plurality of diamond-like shapes spanning from the bottom of the lower half sub-band 972b of the servo track 542 to the top of the upper half sub-band 972a.

The servo pattern 1000 has a height 1088 in the x-direction that is greater than the distance 658a between the first and second servo heads 650a, 650b. In some embodiments, a first servo head, such as the first servo head 650a of the first module 600a of the tape head 601 of FIGS. 6A-6B, is configured to read the servo pattern 1050 disposed within the lower half sub-band 972b, and a second servo head, such as the second servo head 650b of the first module 600a, is configured to concurrently read the servo pattern 1050 disposed within the upper half sub-band 972a.

FIGS. 11A-11B illustrate various types of servo patterns 1100, 1150, respectively, that may be written to a servo tracks, according to various embodiments. The servo patterns 1100, 1150 may be written to the servo tracks 542a, 542b of the tape 544 of FIGS. 6A-9B. The servo patterns 1100, 1150 may be read by any of the tape heads 601, 701, 801 of FIGS. 6A-8B. The servo patterns 1100, 1150 of FIGS. 11A-11B may be used in combination with any of the servo patterns 1000, 1050, 1075 of FIGS. 10A-10C. However, the servo patterns 1100, 1150 of FIGS. 11A-11B are shown illustrating various modifications to the servo pattern 1050 of FIG. 10B.

FIG. 11A illustrates a servo pattern 1100 where the first and second sets of one or more lines 1082, 1084 are non-overlapping between the upper and lower half sub-bands 972a, 972b. For example, a bottom 1082a of the first set of one or more lines in the upper half sub-band 972a do not extend into the lower half sub-band 972b, as illustrated by line 1190. Line 1190 is the demarcation line between the upper half sub-band 972a and the lower half sub-band 972b. The bottom 1082a of the first set of one or more lines in the upper half sub-band 972a may extend to the line 1190 without crossing the line 1190. Similarly, a top 1082b of the first set of one or more lines in the lower half sub-band 972b do not extend into the upper half sub-band 972a, as illustrated by line 1190. The top 1082b of the first set of one or more lines in the lower half sub-band 972b may extend to the line 1190 without crossing the line 1190.

FIG. 11B illustrates a servo pattern 1150 where the first and second sets of one or more lines 1082, 1084 are overlapping between the upper and lower half sub-bands 972a, 972b. For example, a bottom 1082a of the first set of one or more lines in the upper half sub-band 972a does extend into the lower half sub-band 972b a small amount, as illustrated by line 1190. Line 1190 is the demarcation line between the upper half sub-band 972a and the lower half sub-band 972b. Similarly, a top 1082b of the first set of one or more lines in the lower half sub-band 972b does extend into the upper half sub-band 972a a small amount, as illustrated by line 1190. As such, the first and second sets of one or more lines 1082, 1084 of the upper half sub-band 972a may overlap line 1190 into the lower half sub-band 972b, and the first and second sets of one or more lines 1082, 1084 of the lower half sub-band 972b may overlap line 1190 into the upper half sub-band 972a.

Therefore, by utilizing a tape head comprising one or more modules, each module comprising at least two servo heads that concurrently read from the same servo track, the tape head can be more accurately positioned on a tape for writing and reading data. Additionally, the at least two servo heads that concurrently read from the same servo track can be used to compute the tape head position information, which increases the signal-to-noise ratio by about 3 dB, enabling more accurate track following, and thus, higher track densities. The position information of the tape head may be computed because the at least two servo heads that concurrently read servo data or servo patterns from the same servo track are spaced far enough apart to ensure that the two magnetic media noise signatures are not correlated.

Moreover, the at least two servo heads configured to concurrently read servo data or servo patterns from the same servo track further provide redundancy in the event one or more servo heads are temporarily non-functional. The at least two servo heads configured to concurrently read servo data or servo patterns from the same servo track may also provide information regarding the state of the tape, such as local expansion or contraction within the servo tracks, or any deformities of the tape that occurred due to TDS effects. As such, the tape head will be more accurately and precisely positioned for reading and writing data to the tape.

In one embodiment, a tape head comprises one or more modules, each of the one or more modules comprising: a plurality of write heads aligned in a first row, the first row extending in a first direction, a first servo head offset from the plurality of write heads in the first direction and a second direction perpendicular to the first direction, a second servo head disposed adjacent to the first servo head, the second servo head being aligned with the first servo head in a second row parallel to the first row, a plurality of read heads disposed adjacent to the second servo head, the plurality of read heads being aligned in a third row parallel to the first and second rows, a third servo head disposed adjacent to the plurality of read heads, the third servo head being aligned in the second row, wherein the third servo head is spaced from the second servo head by the plurality of read heads, and a fourth servo head disposed adjacent to the third servo head, the fourth servo head being aligned in the second row.

The first servo head and the second servo head are configured to concurrently read first servo data from a first servo track. The third servo head and the fourth servo head are configured to concurrently read second servo data from a second servo track. Each of the one or more modules further comprises: a fifth servo head disposed adjacent to the first servo head, the fifth servo head being aligned in the second row, and a sixth servo head disposed adjacent to the fourth servo head, the sixth servo head being aligned in the second row. One or more of the first, second, and fifth servo heads are configured to concurrently read first servo data from a first servo track, and wherein one or more of the third, fourth, and sixth servo heads are configured to concurrently read second servo data from a second servo track. Each module of the one or more modules is controllable to write data to a tape using the plurality of write heads and read verify the data using the plurality of read heads. The tape head further comprises one or more additional servo heads disposed between at least two of the read heads of the plurality of read heads, the one or more additional servo heads being aligned in the second row.

A tape drive comprises the tape head and a controller configured to: concurrently read and process first servo data read from a first servo track by the first servo head and the second servo head, concurrently read and process second servo data read from a second servo track by the third servo head and the fourth servo head, and dynamically adjust a position of the tape head based on one or more of the processed first servo data or the processed second servo data. The controller is further configured to: compute the position of the tape head based on a spacing between the first servo head and the second servo head, and compute the position of the tape head based on a spacing between the third servo head and the fourth servo head.

In another embodiment, a tape head comprises a first module comprising: a plurality of first write heads aligned in a first row, the first row extending in a first direction, two or more first servo heads aligned in a second row parallel to the first row, the second row extending in the first direction, wherein the two or more first servo heads are disposed adjacent to one another, two or more second servo heads aligned in the second row, the two or more second servo heads being disposed adjacent to one another, and a plurality of first read heads aligned in a third row parallel to the first and second rows between the two or more first servo heads and the two or more second servo heads. The tape head further comprises a second module, comprising: a plurality of second write heads aligned in a fourth row parallel to the first and second rows, the third row extending in the first direction, two or more third servo heads aligned in a fifth row parallel to the fourth row, the fourth row extending in the first direction, wherein the two or more third servo heads are disposed adjacent to one another, two or more fourth servo heads aligned in a sixth row parallel to the fourth and fifth rows, the two or more fourth servo heads being disposed adjacent to one another, and a plurality of second read heads aligned in the fifth row between the two or more third servo heads and the two or more fourth servo heads.

The two or more first servo heads are configured to concurrently read servo data from a first servo track, the two or more second servo heads are configured to concurrently read servo data from a second servo track, the two or more third servo heads are configured to concurrently read servo data from the first servo track, and the two or more fourth servo heads are configured to concurrently read servo data from the second servo track. At least one first servo head of the two or more first servo heads is aligned in a second direction perpendicular to the first direction with at least one third servo head of the two or more third servo heads. At least one second servo head of the two or more second servo heads is aligned in the second direction with at least one fourth servo head of the two or more fourth servo heads. At least one first servo head of the two or more first servo heads is offset in a second direction perpendicular to the first direction from at least one third servo head of the two or more third servo heads, and wherein at least one second servo head of the two or more second servo heads is offset in the second direction from at least one fourth servo head of the two or more fourth servo heads.

The two or more first servo heads are three first servo heads, the two or more second servo heads are three second servo heads, the two or more third servo heads are three second third heads, and the two or more fourth servo heads are three fourth servo heads. Each of the three first servo heads are aligned in a second direction perpendicular to the first direction with each of the three third servo heads, and wherein each of the three second servo heads are aligned in the second direction with each of the three fourth servo heads. The first module is controllable to write first data to a tape using the plurality of first write heads and read verify the first data using the plurality of first read heads. The second module is controllable to write second data to the tape using the plurality of second write heads and read verify the second data using the plurality of second read heads. A tape drive comprises the tape head and a controller configured to: concurrently read and process first servo data read from a first servo track by the first servo head and the second servo head, concurrently read and process second servo data read from a second servo track by the third servo head and the fourth servo head, and dynamically adjust a position of the tape head based on one or more of the processed first servo data or the processed second servo data.

In yet another embodiment, a tape drive comprises a tape head comprising a first module, the first module comprising: a plurality of first write heads aligned in a first row, the first row extending in a first direction, a plurality of first read heads aligned in a second row parallel to the first row, the second row extending in the first direction, and at least four first servo heads aligned in a third row parallel to the first and second rows, wherein two or more first servo heads of the at least four first servo heads are configured to concurrently read first servo data from a first servo track, and means for concurrently processing the first servo data from the two or more first servo heads.

The tape head further comprises one or more additional servo heads disposed between at least two of the first read heads of the plurality of first read heads, the one or more additional servo heads being aligned in the third row. The tape head further comprises a second module, the second module comprising: a plurality of second write heads aligned in a third row parallel to the first and second rows, the third row extending in the first direction, a plurality of second read heads aligned in a fourth row parallel to the third row, the fourth row extending in the first direction, and at least four second servo heads aligned in the fourth row, wherein two or more second servo heads of the at least four second servo heads are configured to concurrently read second servo data from a second servo track. Two or more first servo heads of the at least four first servo heads are aligned in a second direction perpendicular to the first direction with two or more second servo heads of the at least four second servo heads. Two or more first servo heads of the at least four first servo heads are offset in a second direction perpendicular to the first direction with two or more second servo heads of the at least four second servo heads.

The tape drive further comprises means for concurrently processing the second servo data from the two or more second servo heads, and means for dynamically adjusting a position of the tape head based on one or more of the processed first servo data and the processed second servo data. The tape drive further comprises means for computing the position of the tape head based on a spacing between the two or more first servo heads, and means for computing the position of the tape head based on a spacing between the two or more second servo heads.

While the foregoing is directed to embodiments of the present disclosure, other and further embodiments of the disclosure may be devised without departing from the basic scope thereof, and the scope thereof is determined by the claims that follow.

What is claimed is:

1. A tape head, comprising:
   one or more modules, each of the one or more modules comprising:
      a plurality of write heads aligned in a first row, the first row extending in a first direction;
      a first servo head offset from the plurality of write heads in both the first direction and in a second direction perpendicular to the first direction;
      a second servo head disposed adjacent to the first servo head, the second servo head being aligned with the first servo head in a second row parallel to the first row;
      a plurality of read heads disposed adjacent to the second servo head, the plurality of read heads being aligned in a third row parallel to the first and second rows;
      a third servo head disposed adjacent to the plurality of read heads, the third servo head being aligned in the second row, wherein the third servo head is spaced from the second servo head by the plurality of read heads; and
      a fourth servo head disposed adjacent to the third servo head, the fourth servo head being aligned in the second row.

2. The tape head of claim 1, wherein the first servo head and the second servo head are configured to concurrently read first servo data from a first servo track, and wherein the third servo head and the fourth servo head are configured to concurrently read second servo data from a second servo track.

3. The tape head of claim 1, wherein each of the one or more modules further comprises:
   a fifth servo head disposed adjacent to the first servo head, the fifth servo head being aligned in the second row; and
   a sixth servo head disposed adjacent to the fourth servo head, the sixth servo head being aligned in the second row.

4. The tape head of claim 3, wherein one or more of the first, second, and fifth servo heads are configured to concurrently read first servo data from a first servo track, and wherein one or more of the third, fourth, and sixth servo heads are configured to concurrently read second servo data from a second servo track.

5. The tape head of claim 1, wherein each module of the one or more modules is controllable to write data to a tape using the plurality of write heads and read verify the data using the plurality of read heads.

6. The tape head of claim 1, further comprising one or more additional servo heads disposed between at least two of the read heads of the plurality of read heads, the one or more additional servo heads being aligned in the second row.

7. A tape drive, comprising:
   the tape head of claim 1; and
   a controller configured to:
      concurrently read and process first servo data read from a first servo track by the first servo head and the second servo head;
      concurrently read and process second servo data read from a second servo track by the third servo head and the fourth servo head; and
      dynamically adjust a position of the tape head based on one or more of the processed first servo data or the processed second servo data.

8. The tape drive of claim 7, wherein the controller is further configured to:
   compute the position of the tape head based on a spacing between the first servo head and the second servo head; and
   compute the position of the tape head based on a spacing between the third servo head and the fourth servo head.

9. A tape head, comprising:
   a first module, comprising:
      a plurality of first write heads aligned in a first row, the first row extending in a first direction;
      two or more first servo heads aligned in a second row parallel to the first row, the second row extending in the first direction, wherein the two or more first servo heads are disposed adjacent to one another;
      two or more second servo heads aligned in the second row, the two or more second servo heads being disposed adjacent to one another; and
      a plurality of first read heads aligned in a third row parallel to the first and second rows between the two or more first servo heads and the two or more second servo heads; and
   a second module, comprising:
      a plurality of second write heads aligned in a fourth row parallel to the first and second rows, the third row extending in the first direction;
      two or more third servo heads aligned in a fifth row parallel to the fourth row, the fourth row extending in the first direction, wherein the two or more third servo heads are disposed adjacent to one another;

two or more fourth servo heads aligned in the fifth row, the two or more fourth servo heads being disposed adjacent to one another; and a plurality of second read heads aligned in a sixth row parallel to the fourth and fifth rows between the two or more third servo heads and the two or more fourth servo heads.

10. The tape head of claim 9, wherein the two or more first servo heads are configured to concurrently read servo data from a first servo track, the two or more second servo heads are configured to concurrently read servo data from a second servo track, the two or more third servo heads are configured to concurrently read servo data from the first servo track, and the two or more fourth servo heads are configured to concurrently read servo data from the second servo track.

11. The tape head of claim 9, wherein at least one first servo head of the two or more first servo heads is aligned in a second direction perpendicular to the first direction with at least one third servo head of the two or more third servo heads, and wherein at least one second servo head of the two or more second servo heads is aligned in the second direction with at least one fourth servo head of the two or more fourth servo heads.

12. The tape head of claim 9, wherein at least one first servo head of the two or more first servo heads is offset in a second direction perpendicular to the first direction from at least one third servo head of the two or more third servo heads, and wherein at least one second servo head of the two or more second servo heads is offset in the second direction from at least one fourth servo head of the two or more fourth servo heads.

13. The tape head of claim 9, wherein the two or more first servo heads are three first servo heads, the two or more second servo heads are three second servo heads, the two or more third servo heads are three second third heads, and the two or more fourth servo heads are three fourth servo heads.

14. The tape head of claim 13, wherein each of the three first servo heads is aligned in a second direction perpendicular to the first direction with each of the three third servo heads, and wherein each of the three second servo heads is aligned in the second direction with each of the three fourth servo heads.

15. The tape head of claim 9, wherein the first module is controllable to write first data to a tape using the plurality of first write heads and read verify the first data using the plurality of first read heads, and wherein the second module is controllable to write second data to the tape using the plurality of second write heads and read verify the second data using the plurality of second read heads.

16. A tape drive, comprising:
the tape head of claim 9; and
a controller configured to:
concurrently process first servo data read from a first servo track by the two or more first servo heads or the two or more third servo heads;
concurrently process second servo data read from a second servo track by the two or more second servo heads or the two or more fourth servo heads; and
dynamically adjust a position of the tape head based on one or more of the processed first servo data or the processed second servo data.

17. A tape drive, comprising:
a tape head, comprising:
a first module, the first module comprising:
a plurality of first write heads aligned in a first row, the first row extending in a first direction;
a plurality of first read heads aligned in a second row parallel to the first row, the second row extending in the first direction; and
at least four first servo heads aligned in a third row parallel to the first and second rows, wherein two or more first servo heads of the at least four first servo heads are configured to concurrently read first servo data from a first servo track; and
means for concurrently processing the first servo data from the two or more first servo heads.

18. The tape drive of claim 17, further comprising one or more additional servo heads disposed between at least two of the first read heads of the plurality of first read heads, the one or more additional servo heads being aligned in the third row.

19. The tape drive of claim 17, wherein the tape head further comprises a second module, the second module comprising:
a plurality of second write heads aligned in a fourth row parallel to the first and second rows, the fourth row extending in the first direction;
a plurality of second read heads aligned in a fifth row parallel to the fourth row, the fifth row extending in the first direction; and
at least four second servo heads aligned in a sixth row parallel to the fourth and fifth rows, wherein two or more second servo heads of the at least four second servo heads are configured to concurrently read second servo data from a second servo track.

20. The tape drive of claim 19, wherein two or more first servo heads of the at least four first servo heads are aligned in a second direction perpendicular to the first direction with two or more second servo heads of the at least four second servo heads.

21. The tape drive of claim 19, wherein two or more first servo heads of the at least four first servo heads are offset in a second direction perpendicular to the first direction with two or more second servo heads of the at least four second servo heads.

22. The tape drive of claim 19, further comprising:
means for concurrently processing the second servo data from the two or more second servo heads; and
means for dynamically adjusting a position of the tape head based on one or more of the processed first servo data and the processed second servo data.

23. The tape drive of claim 22, further comprising:
means for computing the position of the tape head based on a spacing between the two or more first servo heads; and
means for computing the position of the tape head based on a spacing between the two or more second servo heads.

* * * * *